(12) United States Patent
Katayama et al.

(10) Patent No.: US 9,650,061 B2
(45) Date of Patent: May 16, 2017

(54) HAND CART FOR WALKING STABILIZATION AND CARRYING ARTICLES ACCORDING TO A MOVEMENT MODE

(71) Applicant: RT. WORKS Co., Ltd., Osaka-shi, Osaka (JP)

(72) Inventors: Takahiro Katayama, Osaka (JP); Atsushi Koujina, Osaka (JP)

(73) Assignee: RT. WORKS CO., LTD., Osaka-Shi, Osaka (JP)

( * ) Notice: Subject to any disclaimer, the term of this patent is extended or adjusted under 35 U.S.C. 154(b) by 0 days.

(21) Appl. No.: 15/195,568

(22) Filed: Jun. 28, 2016

(65) Prior Publication Data

US 2017/0001656 A1    Jan. 5, 2017

(30) Foreign Application Priority Data

Jul. 2, 2015    (JP) .................................. 2015-133504

(51) Int. Cl.

| | |
|---|---|
| *G06F 7/70* | (2006.01) |
| *B62B 5/00* | (2006.01) |
| *B62B 5/04* | (2006.01) |
| *B62B 5/06* | (2006.01) |
| *B60W 30/18* | (2012.01) |
| *A61H 3/04* | (2006.01) |

(52) U.S. Cl.
CPC ............ *B62B 5/0069* (2013.01); *A61H 3/04* (2013.01); *B60W 30/18109* (2013.01); *B62B 5/0033* (2013.01); *B62B 5/0414* (2013.01); *B62B 5/06* (2013.01); *A61H 2003/043* (2013.01); *A61H 2003/046* (2013.01); *A61H 2201/5007* (2013.01); *B60W 2550/142* (2013.01); *B60W 2720/24* (2013.01); *B60W 2720/30* (2013.01)

(58) Field of Classification Search
CPC ................................ B62B 5/0069; A61H 3/04
See application file for complete search history.

(56) References Cited

U.S. PATENT DOCUMENTS

| | | | |
|---|---|---|---|
| 5,746,282 A | 5/1998 | Fujiwara et al. | |
| 2007/0080000 A1* | 4/2007 | Tobey ................... | A61G 5/045 180/21 |
| 2010/0222994 A1* | 9/2010 | Field ..................... | A63C 17/01 701/124 |

FOREIGN PATENT DOCUMENTS

| | | |
|---|---|---|
| JP | 2898969 | 6/1999 |
| JP | 3032698 | 4/2000 |

* cited by examiner

*Primary Examiner* — Adam Alharbi
(74) *Attorney, Agent, or Firm* — Baker & Hostetler LLP

(57) ABSTRACT

A hand cart capable of satisfying walking stabilization and facilitation of carrying articles according to a movement mode includes a control section operable, based on a rotational angle of a wheel section, to calculate a movement distance and a traveling direction, and, according to the traveling direction and the inclination angle, to execute an assist control of causing a wheel driving section to generate a driving torque for assist force or braking torque for braking force, wherein the control section is operable, based on a movement distance and the inclination angle, to calculate an angular change rate of the inclination angle, and, when a contact with a grip member is detected, and the angular change rate is equal to or less than a given threshold, to execute the assist control.

21 Claims, 8 Drawing Sheets

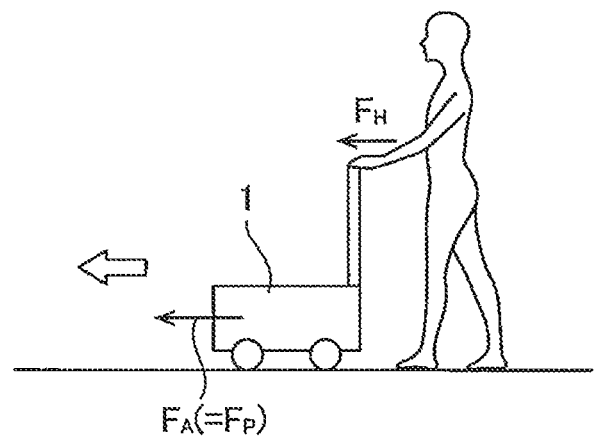
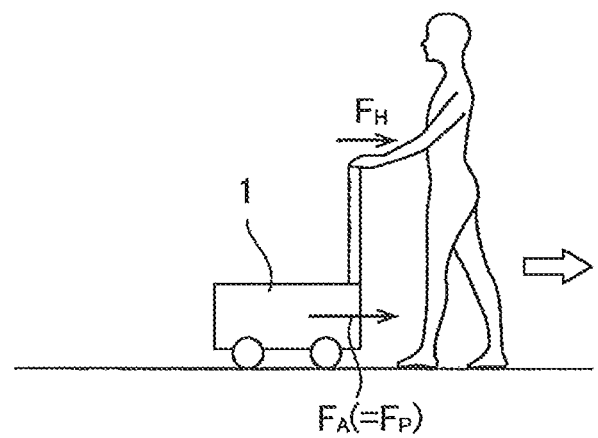
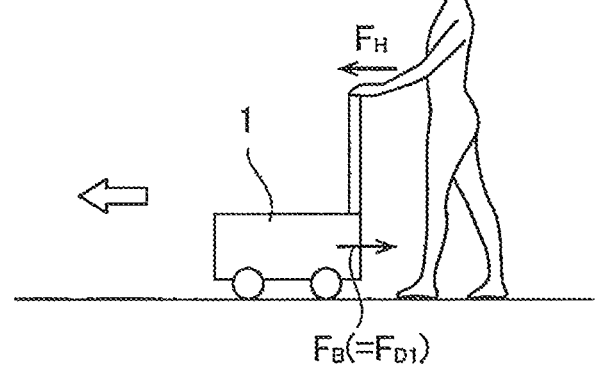

| Zone | Transit time | Speed | Time required for passing through each zone | Difference between required times (absolute value) |
|---|---|---|---|---|
| 0 | t0 | 0 | — | — |
| 1 | t1 | v1 | p1 | — |
| 2 | t2 | v2 | p2 | — |
| 3 | t3 | v3 | p3 | d3 |
| 4 | t4 | v4 | p4 | d4 |
| ⋮ | ⋮ | ⋮ | ⋮ | ⋮ |
| 20 | t20 | v20 | p20 | d20 |
| Total | — | — | — | $d_{total}$ |

HAND CART FOR WALKING STABILIZATION AND CARRYING ARTICLES ACCORDING TO A MOVEMENT MODE

TECHNICAL FIELD

The present invention relates to a hand cart, and more particularly to a hand cart capable of driving a wheel mounted to a cart body by a wheel driving section so as to assist walking of a walker or user.

BACKGROUND ART

In late years, there have been made various proposals regarding a walking assist device using robotic technologies to assist an elderly person in going out or carrying articles such as baggage or goods. These proposals include a walking assist device constructed by incorporating a motor and a controller into a conventional hand cart or walking frame for an elderly person. For example, a walking assist device designed for use by an elderly person whose muscles has weaken is configured such that, in a given situation, braking is automatically activated by control of a controller, without a need for a user to manipulate a hand brake to activate braking. As above, it has been expected to realize stabilization of walking using a walking assist device.

A walking aid described in the Patent Document 1 (JP 2898969B) is configured to be capable of setting movement characteristics (speed, resistance, aid gain, and turning gain) of the walking aid arbitrarily and independently, with respect to each of a plurality of modes of movement of a target pedestrian or user to be aided, including forward movement, backward movement and turning, i.e., according to each situation of the target user. Therefore, this walking aid makes it possible to ensure safe walking during forward movement, backward movement or turning of a target user.

On the other hand, a power-assisted transport trolley described in the Patent Document 2 (JP 3032698B) comprises a trolley body provided with: drive wheels; a driving section for driving the drive wheels; and a manipulation member to be manipulated by a user. The transport trolley further comprises: an external force detection means to detect respective force components in a propulsion direction and in a steering direction, from an external force applied from the user to the manipulation member; and a control means to cause a driving source for the drive wheels to generate torques according to the propulsion-directional force and the steering-directional force.

The drive wheels comprises a pair of right and left wheels capable of being driven independently of each other. The right and left wheels function as traveling drive wheels, and also function as steering drive wheels when they are driven in a differential manner. These drive wheels are configured to be driven to generate two assist forces corresponding, respectively, to the propulsion-directional force and the steering-directional force each detected by the external force detection means.

The transport trolley described in the Patent Document 2 is also configured to perform correction of the assist force and addition of viscous drag, according to a traveling speed, a loaded weight and an inclination angle. For example, this transport trolley is configured to be controlled such that a force capable of counterbalancing a force urging the trolley body to move downwardly along an inclination of a downward slope is generated as the assist force.

CITATION LIST

Parent Document

Patent Document 1: JP 2898969B
Patent Document 2: JP 3032698B

SUMMARY OF INVENTION

Technical Problem

However, a walking assist device to be used outdoors needs to be enable both of two functions: stabilization of walking; and facilitation of carrying of articles such as goods purchased during shopping. The former is intended to fulfill a desire of a user to move or walk while leaning on the device so as to use it as support, i.e., to fulfill so-called "braking function". On the other hand, the latter is intended to fulfill a desire of a user to move the device by a relatively small force even when heavy articles are loaded thereon, i.e., to fulfill so-called "power-assisting function". The two desires or functions conflict with each other. Thus, the walking assist device is required to perform walking assist while automatically switching between the two functions, depending on the situation.

For example, in the walking aid described in the Patent Document 1, it is attempted to ensure safe walking by setting the movement characteristics (speed, resistance, aid gain and turning gain), with respect to each of a plurality of modes of movement including forward movement, backward movement and turning. However, even in the same mode of movement (e.g., during the forward movement), two different controls (power-assisting and braking controls) are likely to become necessary depending on the situation. Thus, in the walking aid in which each of a plurality of modes of movement is uniquely associated with specific values of the movement characteristics, there is a risk of occurrence of a situation where the stability of walking becomes insufficient.

In the power-assisted transport trolley described in the Patent Document 2, the power-assist function of the drive wheels makes it possible to move the transport trolley by a relatively small force, and the right and left drive wheels configured to be driven independently of each other makes it possible to provide improved turning performance. Furthermore, based on the correction of the assist force and the addition of viscous drag, according to the traveling speed, the loaded weight and the inclination angle, it is attempted to achieve good manipulation feeling, facilitation of delicate control and high safety.

However, as compared to the transport trolley described in the Patent Document 2, a walking assist device is generally lightweight, so that the walking assist device is likely to be displaced to an unintended posture, during walking. For example, it is assumed that a front wheel of the walking assist device falls into a floating state in which it is lifted away from the ground (so-called "wheelie state"). In this case, in a walking assist device employing the technique described in the Patent Document 2, an assist force is generated according to an inclination angle of the device, and thereby the device can travel in a manner unintended by a user. This is likely to lead to falling-over of the user. Moreover, in a downward slope, a user is apt to walk while leaning on the device so as to use it as support. Thus, if the device is configured to simply generate a force capable of counterbalancing a force urging a device body to move downwardly along an inclination of the downward slope, the device is likely to fail to support a force applied from the user, thereby possibly leading to falling-over of the user. Except for a situation where a heavy object is loaded and a situation where the device is moved on an upward slope forwardly, an external force applied from a user to the walking assist device which is lighter in weight than the transport trolley becomes significantly reduced. Therefore, a walking assist device involves difficulty in realizing the technique of controlling the movement thereof mainly according to an external force, as in the transfer trolley described in the Patent Document 2.

The present invention has been made in order to solve such a technical problem, and an object thereof is to provide a hand cart capable of satisfying both of stabilization of walking and facilitation of carrying of articles, according to a mode of movement of the hand cart.

Solution to Technical Problem

In order to solve the above technical problem, the present invention provides a hand cart which comprises: a cart body; a grip member coupled to the cart body and constructed to be gripped by a user during walking; a wheel section for moving the cart body in conformity with walking of the user; a battery for supplying electric power, a wheel driving section for driving the wheel section by electric power from the battery; a grip sensor for detecting a contact of the user with the grip member, a rotational angle sensor for detecting a rotational angle of the wheel section; an inclination angle sensor for detecting an inclination angle of the cart body; a torque sensor for detecting a torque acting on the wheel driving section; and a control section for controlling the wheel driving section, wherein the control section is operable, based on the rotational angle of the wheel section detected by the rotational angle sensor, to calculate a movement distance and a traveling direction of the cart body, and, according to the traveling direction and the inclination angle of the cart body, to execute an assist control of causing the wheel driving section to generate a driving torque for producing an assist force in the traveling direction or a braking torque for producing a braking force in a direction opposite to the traveling direction, and wherein the control section is operable, based on the movement distance and the inclination angle of the cart body, to calculate an angular change rate of the inclination angle per unit movement distance of the cart body, and, when the grip sensor detects the contact with the grip member, and the angular change rate is equal to or less than a given threshold, to execute the assist control.

The hand cart of the present invention is configured to detect the traveling direction and the inclination angle of the cart body using the rotational angle sensor and the inclination angle sensor, and execute the assist control to generate the assist force or braking force, according to a combination of the traveling direction and the inclination angle in each situation. Thus, when the cart body is moving on a sloped road forwardly and upwardly, or forwardly and downwardly, or backwardly and downwardly, or backwardly and upwardly, a user can obtain a desired assist force or braking force. This makes it possible to achieve stabilization of walking and facilitation of carrying of articles.

In addition, the hand cart of the present invention is configured such that the assist control according to such situations is executed when the user is walking using the hand cart, while gripping the grip member, and when the cart body is not in a state in which it is suddenly inclined, like a wheelie state. For this purpose, the hand cart of the present invention is configured to calculate the angular change rate of the inclination angle of the cart body changed per unit movement distance, and, when the angular change rate becomes greater than a given threshold, determine that the cart body is suddenly inclined. Thus, it becomes possible to distinguish such a situation from a situation where the cart body is traveling on a sloped road. Therefore, for example, in the case where a front wheel is floated from the ground when the user stumbles on the road and leans on the hand cart, the assist control is never executed, so that it becomes possible to prevent the hand cart from behaving in a manner unintended by the user, and thus prevent falling-over of the user.

In one embodiment of the present invention, the control section is operable, based on the calculated traveling direction and the inclination angle of the cart body, to determine whether the cart body is moving on a sloped road forwardly and upwardly, or forwardly and downwardly, or backwardly and downwardly, or backwardly and upwardly, and, based on the inclination angle of the cart body, to calculate a component of gravitational force to be applied to the hand cart in a direction parallel to a surface of the sloped road, and wherein, the control section is operable, during the assist control, (i) when the cart body is moving on the sloped road forwardly and upwardly, to generate the driving torque to produce a gravitational compensation force capable of counterbalancing the gravitational force component parallel to the surface of the sloped road; (ii) when the cart body is moving on the sloped road forwardly and downwardly, to generate the braking torque to produce a braking force greater than the gravitational force component parallel to the surface of the sloped road; (iii) when the cart body is moving on the sloped road backwardly and downwardly, to generate the braking torque to produce a braking force less than the gravitational force component parallel to the surface of the sloped road; and (iv) when the cart body is moving on the sloped road backwardly and upwardly, to generate the driving torque to produce a gravitational compensation force capable of counterbalancing the gravitational force component parallel to the surface of the sloped road.

According to this feature, an assist force or braking force having an appropriate magnitude is imparted, in consideration of a magnitude of a component of gravitational force applied to the hand cart in a direction parallel to a surface of the sloped road, and according to a combination of one of forward and backward movements and one of upward and downward movements, on a sloped road. For example, when the cart body is moving on the sloped road downwardly, it is necessary to reliably prevent falling-over of a user. Therefore, this hand cart is configured such that, when the cart body is moving on the sloped road forwardly and downwardly, the braking force is increased to allow a user to feel a resistive force, and, when the cart body is moving on the sloped road backwardly and downwardly, the braking force is reduced to allow the hand cart to naturally come closer to the user. Thus, the hand cart having this feature can reliably achieve the stability of walking of a user and improve the facilitation of carrying of articles, in any situation.

In another embodiment of the present invention, during the assist control, the control section is operable to correct the gravitational compensation force in such a manner as to increase or reduce the gravitational compensation force.

According to this feature, when the cart body is moving on the sloped road forwardly and upwardly or backwardly and upwardly, it is possible to impart, to the cart body, a corrected assist force (an assist force equal to the gravitational compensation force, an assist force greater than the gravitational compensation force or an assist force less than the gravitational compensation force). Thus, the hand cart having this feature can give an appropriate assist force according to leg strength or the like of a user.

In another embodiment of the present invention, the control section is operable, when the grip sensor does not detect any contact with the grip member, to cause the wheel driving section to generate the braking torque in such a manner as to allow a rotational speed of the wheel section calculated based on the rotational angle of the wheel section to become zero.

According to this feature, when a user releases his/her hand from the grip member, the hand cart is automatically stopped. Thus, the user can release his/her hand with a sense of security to perform various operations, even if the hand cart is used outdoors on any road.

In another embodiment of the present invention, the control section is operable to compare a cart speed of the hand cart calculated based on the rotational angle of the wheel section with a given upper limit speed, and, when the cart speed becomes greater than the upper limit speed, to cause the wheel driving section to generate the braking torque in such a manner as to allow the cart speed to become equal to the upper limit speed.

According to this feature, when the cart speed becomes greater than the preset upper limit speed, a restricted torque is generated to return the cart speed to the upper limit speed, instead of rapidly activating braking. Thus, a user can walk at a stable speed which may be the upper limit speed as a target.

In another embodiment of the present invention, the control section is operable to compare a cart speed of the hand cart calculated based on the rotational angle of the wheel section with a target speed which increases with a given acceleration limit, and, when the cart speed becomes greater than the target speed, to cause the wheel driving section to generate the braking torque.

According to this feature, it is possible to detect that the hand cart is suddenly accelerated, for example, in a situation where a user stumbles on the road, and, based on the detection, activate braking to prevent falling-over of the user. Further, this hand cart is configured to compare the cart speed calculated based on the rotational angle detected by the rotational angle sensor with the target speed, instead of using an acceleration sensor, to determine whether or not the cart acceleration becomes greater than the acceleration limit. This makes it possible to improve determination accuracy, as compared to the case of using an acceleration sensor in which a noise component due to vibration or the like of the cart body is liable to mix in a detection signal.

In another embodiment of the present invention, the inclination sensor is operable to detect inclination angles of the cart body at least in a front-rear direction and in a lateral direction thereof, and the wheel section comprises a right wheel and a left wheel which are capable of being independently driven by the wheel driving section, wherein the control section is operable, when, based on the inclination angle of the cart body, the cart body is determined to be in a laterally inclined posture, to control the wheel driving section to drive the right wheel and the left wheel independently in such a manner as to inhibit the cart body from deviating laterally from the traveling direction.

According to this feature, for example, when the cart body is moving on a sloped road having a lateral slope inclined rightwardly and downwardly (diagonally right down), a relatively large torque is given to a right wheel with respect to a left wheel to prevent the hand cart from deviating rightwardly from a desired track to thereby stabilize walking.

In another embodiment of the present invention, the hand cart further comprises an electronically-controlled braking system capable of mechanically locking the wheel section, wherein the braking system is configured to, after mechanically locking the wheel section, maintain a state in which the wheel section is mechanically locked, without receiving any supply of electric power from the battery, and wherein the control section is operable, when the grip sensor does not detect the contact with the grip member continuously for a given period of time, to cause the braking system to lock the wheel section, and stop the torque generation based on the assist control.

According to this feature, for example, when a user releases his/her hand from the gripping member on the sloped road, it is possible to mechanically lock the wheel section by the braking system, after the braking torque is generated and thereby the hand cart is set in a stopped state. Thus, after locking the wheel section by the braking system, it becomes unnecessary to maintain the stopped state by the braking torque using electric power from the battery. This makes it possible to reduce power consumption in the battery, and prevent the hand cart from starting to move on the sloped road due to loss of the battery power.

In another embodiment of the present invention, the control section is operable, when the inclination angle of the cart body is greater than a given angle, to determine that the cart body overturns, and then cause the wheel driving section to generate the braking torque in such a manner as to allow a rotational speed of the wheel section calculated based on the rotational angle of the wheel section to become zero.

According to this feature, when the hand cart overturns, it is possible to prevent the assist control from being performed based on the traveling direction and the inclination angle of the cart body which can be erroneously detected, and thus stop the rotation of the wheel section. This makes it possible to suppress power consumption in the battery due to erroneous detection.

In another embodiment of the present invention, the control section is operable to detect a state-of-charge of the battery, and, when the state-of-charge of the battery becomes equal to or less than a first state-of-charge threshold, to execute the assist control in such a manner as to reduce the driving torque, but not to reduce the braking torque, as compared to when the state-of-charge of the battery is greater than the first state-of-charge threshold.

According to this feature, as the state-of-charge of the battery is lowered, the assist force is reduced, and, on the other hand, the braking force is maintained. Thus, a user can walk using the hand cart as support, with a sense of security. This makes it possible to reduce a risk of falling-over.

In another embodiment of the present invention, the control section is operable to detect a state-of-charge of the battery, and, when the state-of-charge of the battery becomes equal to or less than a second state-of-charge threshold, to cause the wheel driving section to generate the braking torque in such a manner as to allow a rotational speed of the wheel section calculated based on the rotational angle of the wheel section to become zero.

According to this feature, when the state-of-charge of the battery is lowered, the rotation of the wheel section is stopped. This makes it possible to safely stop the hand cart before the behavior of the hand cart becomes unstable due to discharging of the battery.

In another embodiment of the present invention, the inclination sensor comprises an angular speed sensor and an acceleration sensor, wherein the inclination angle of the cart body is calculated based on an angle obtained by integrating output values of the angular speed sensor and an inclination angle obtained from the acceleration sensor.

According to this feature, it is possible to enhance detection accuracy by calculating the inclination angle using outputs of the angular speed sensor and the acceleration sensor.

In another embodiment of the present invention, the control section is operable, when it determines that there is no fluctuation in output value of the acceleration sensor, to perform a zero point correction for the angular speed sensor.

According to this feature, it is possible to suppress accumulation of errors to enhance detection accuracy, by performing the zero point correction for the angular speed sensor during the stopped state of the hand cart.

In another embodiment of the present invention, the hand cart further comprises a force sensor for detecting a pressure applied from the user to the grip member, wherein the control section is operable, when it determines, based on the inclination angle of the cart body, that the cart body is in a posture where a front portion thereof is located above a rear portion thereof; and determines, based on detection of the pressure by the force sensor, that a pressure is applied to the grip member in a direction backward of the cart body, to execute the assist control for the situation where the cart body is moving on the sloped road backwardly and downwardly.

According to this feature, in a situation where the hand cart is located on the sloped road in a posture where the front thereof is located above the rear portion thereof, it is determined whether the hand cart is moving forwardly or backwardly, according to a direction of a pressure detected by the force sensor. Thus, for example, when the hand cart stops on the sloped road, a mode of the assist control can be appropriately selected according to the direction of the pressure applied to the grip member.

In another embodiment of the present invention, the hand cart further comprises a force sensor for detecting a pressure applied from the user to the grip member, wherein the control section is operable to execute the assist control in such a manner as to add, to the assist force, an additional assist force derived from multiplying, by a constant scale factor, the pressure detected by the force sensor.

According to this feature, the assist force is increased according to the pressure applied from the user to the gripping portion. This makes it possible to further facilitate carrying of articles.

In another embodiment of the present invention, the control section is operable, when the cart body is moving on the sloped road forwardly and downwardly, not to add the additional assist force.

According to this feature, in a situation where the cart body is moving on a sloped road forwardly and downwardly, the additional assist force is not added for the sake of safety. In this situation, the user is apt to lean on the hand cart so as to use the hand cart as support, and thereby the grip member is likely to be pressed. If the additional assist force is added in response to this pressing force, the speed of the hand cart is increased to cause the hand cart to move away from the user. Thus, there is a risk that the user falls over due to the loss of support. However, in this hand cart, when the cart body is moving on the sloped road forwardly and downwardly, the addition of the additional assist force is not performed. This makes it possible to prevent falling-over of the user.

In another embodiment of the present invention, the grip sensor comprises a right detection section and a left detection section provided, respectively, in a right region and a left region of the grip member, and each operable to detect a contact of the user with the grip member, wherein the control section is operable, when the grip sensor detects the contact of the user by only one of the right detection section and the left detection section, to cause the wheel driving section to generate the braking torque in such a manner as to allow a rotational speed of the wheel section calculated based on the rotational angle of the wheel section to become zero.

According to this feature, when the user grips the grip member by only one hand, the hand cart is stopped. Thus, for example, in a situation where the user stretches the other hand to select goods during shopping, even when an unintended pressure is applied to the grip member, the hand cart never behaves in an unintended manner. Thus, it becomes possible to prevent falling-over of the user.

In another embodiment of the present invention, the grip sensor comprises a right detection section and a left detection section provided, respectively, in a right region and a left region of the grip member, and each operable to detect a contact of the user with the grip member, wherein the control section is operable, when the grip sensor detects the contact of the user by only one of the right detection section and the left detection section, not to add the additional assist force.

According to this feature, when the user grips the grip member by only one hand, the additional assist force is not added even when a pressure is applied to the grip member. Thus, for example, in a situation where the user stretches the other hand to select goods during shopping, even when an unintended pressure is applied to the grip member, the additional assist force will never be applied to the hand cart. This makes it possible to prevent the hand cart to move away from the user, and thus prevent falling-over of the user.

In another embodiment of the present invention, the control section is capable of changing at least one of a plurality of parameters consisting of: the constant scale factor for use in deriving the additional assist force from the pressure detected by the force sensor, the upper limit speed and the acceleration limit; a magnitude of the braking force to be generated when the cart body is moving on the sloped road forwardly and downwardly; selection as to whether, when the grip sensor detects the contact of the user by only one of the right detection section and the left detection section thereof, the control section operates to cause the wheel driving section to generate the braking torque in such a manner as to allow the rotational speed of the wheel section to become zero, or to keep from the addition of the additional assist force; and a magnitude of a braking force to be added during movement on a flat road.

According to this feature, the user can optimize movement characteristics of the hand cart, so that it becomes possible to further improve the stabilization of walking and the facilitation of carrying of articles.

In another embodiment of the present invention, the control section has an automatic parameter setting mode, and wherein the control section is operable, in the automatic parameter setting mode, to set at least one of the parameters, based on the cart speed of the hand cart and a fluctuation in the cart speed calculated using the rotational angle of the wheel section obtained as a result of movement of the hand cart over a given distance.

According to this feature, through test walking, the user can automatically set the at least one parameter by reflecting the actual walking state.

In another embodiment of the present invention, the hand cart further comprises an external device operable to transmit a setting-change request signal for changing the setting of the at least one parameter, via a wireless line, wherein the control section is operable, at least when the grip sensor does not detect the contact with the grip member, or the control section detects a stopped state of the hand cart based on the rotational angle of the cart body, at a time when the control section receives the setting-change request signal from the external device, to change the setting the at least one parameter based on the setting-change request signal.

According to this feature, when the hand cart is in a non-used state, setting of the at least one parameter of the hand cart can be changed by means of remote control using the external device. In this hand cart, in order to prevent falling-over or off-balance of the user due to a change in setting of the at least one parameter during use of the hand cart, non-contact with the grip member and/or stop of the hand cart are set as conditions for permitting a change in setting of the at least one parameter.

Effect of Invention

The present invention can provide a hand cart capable of satisfying both of stabilization of walking and facilitation of carrying of articles, according to a mode of movement of the hand cart.

BRIEF DESCRIPTION OF DRAWINGS

FIGS. 3A to 3C are explanatory diagrams of an assist mode and a braking mode of the hand cart according to this embodiment.

DESCRIPTION OF EMBODIMENTS

Figure 1:
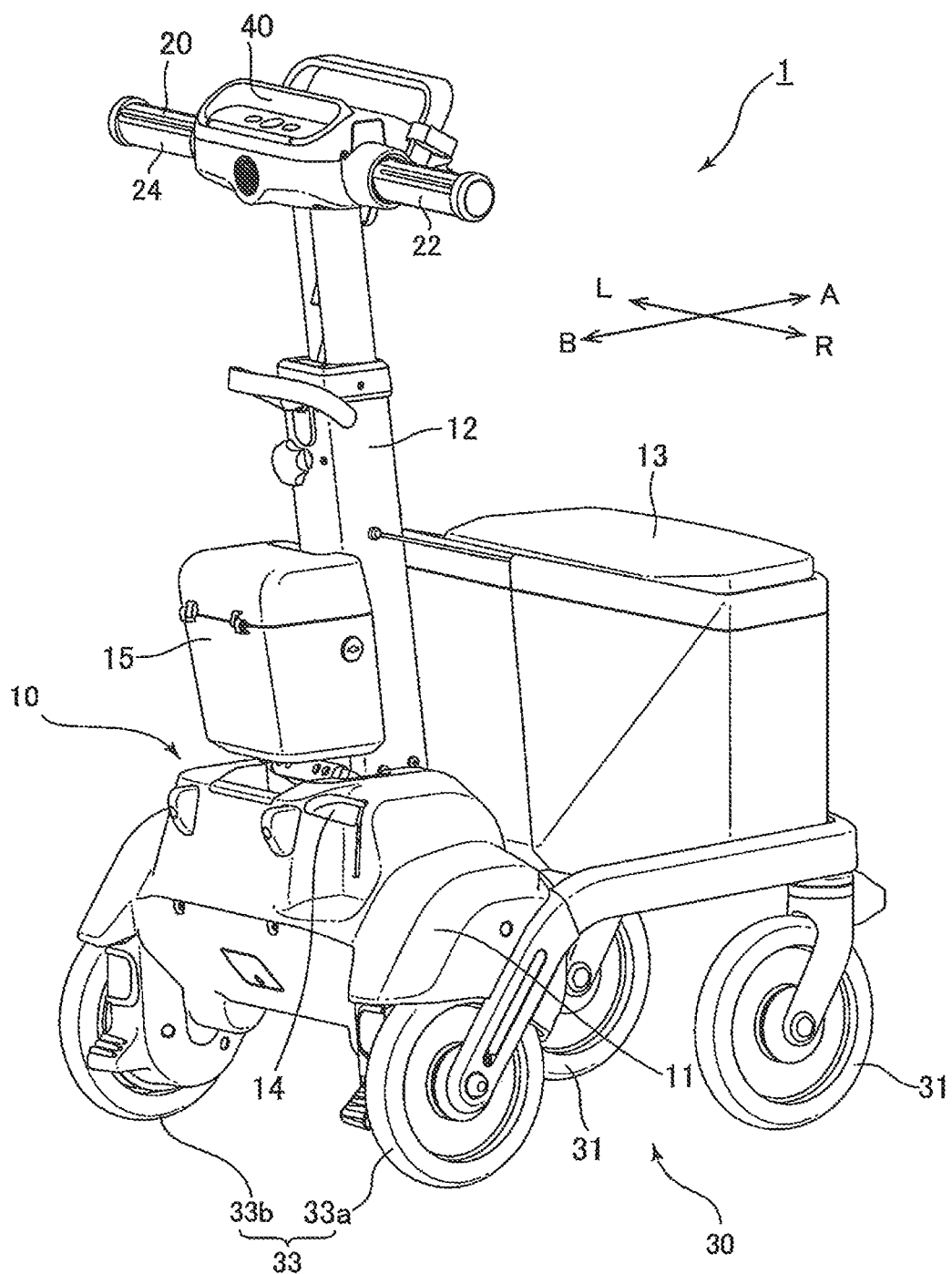
FIG. 1 is a perspective view depicting a hand cart according to one embodiment of the present invention.

First of all, with reference to FIG. 1, a configuration of a hand cart according to one embodiment of the present invention will be described.

The hand cart 1 according to this embodiment is a wheeled vehicle or cart for assisting walking of a user (elderly person or the like), and comprises a cart body 10, a handle bar (grip member) 20, a wheel section 30, and an operation panel 40. A walker or user can move the hand cart 1 forwardly by pushing the handle bar 20, or backwardly by pulling the handle bar 20, while gripping the handle bar 20 with both hands. In this case, the walker can comfortably walk by receiving adequate walking assist (i.e., assist force or braking force) from the hand cart 1 according to a situation and a setting.

The cart body 10 comprises a base member 11, and a post 12 extending upwardly from a rear region of the base member 11. The post 12 is constructed to be stretchable and retractable in conformity to a height of a user. The base member 11 is provided with an article basket 13, a braking system 14, and a battery container 15.

The handle bar 20 is disposed to extend laterally from an upper end of the post 12. The handle bar 20 has right and left grip portions 22, 24 provided, respectively, at opposite ends thereof and constructed to be gripped by the user during walking.

The operation panel 40 is disposed in a central region of the handle bar 20. The operation panel 40 is provided with a plurality of push buttons and a plurality of indicators. The user can use the operation panel 40 to set various parameters and check an operating status.

The wheel section 30 comprises a pair of driven wheels (free wheels) 31 as front wheels and a pair of drive wheels 33 as rear wheels. The driven wheels 31 and the drive wheels 33 are mounted to the base member 11 of the cart body 10. The drive wheels 33 is composed of a right drive wheel 33a and a left drive wheel 33b which are configured to be driven independently.

Figure 2:
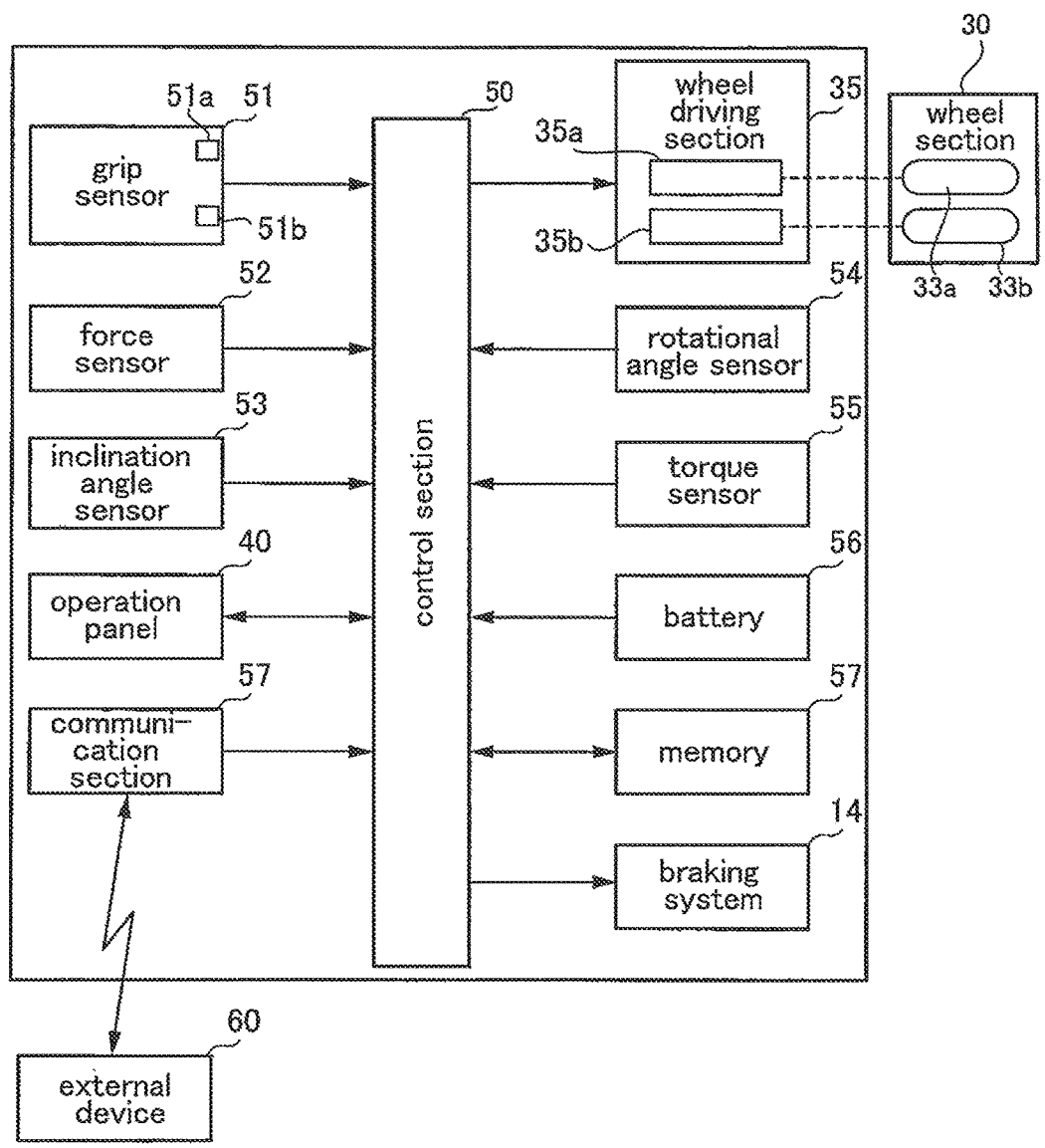
FIG. 2 is a block diagram depicting an electrical configuration of the hand cart according to this embodiment.

Next, with reference to FIG. 2, an electrical configuration of the hand cart 1 according to this embodiment will be described.

The hand cart 1 comprises a control section 50, and a driving mechanism and various sensors, each connected to the control section 50.

The control section 50 is realized by a circuit board, and configured to receive detection signals from the sensors, and control the driving mechanism based on the received detection signals, set parameters and others.

A wheel driving section 35 is constructed such that it comprises two electric motors and a driving circuit, and configured to receive a supply of electric power from a battery 56 to drive the drive wheels 33. The wheel driving section 35 is equipped with a driving unit 35a for rotationally driving the right drive wheel 33a, and a driving unit 35b for rotationally driving the left drive wheel 33b, so that it is operable to drive each of the right drive wheel 33a and the left drive wheel 33b, independently. Further, the wheel driving section 35 is operable to cause the hand cart 1 to travel in a forward movement direction (direction A in FIG.

1) and a backward movement direction (direction B in FIG. 1). For this purpose, each of the electric motors is constructed to be rotatable in both forward and reverse directions.

The control section 50 is operable, based on a look-up table stored in a memory 57, to calculate a target torque from a required assist force and a required braking force. Then, the control section 50 is operable to perform an assist control of supplying a driving current to each of the two electric motors of the wheel driving section 35, independently, while monitoring a torque detection signal from an aftermentioned torque sensor 55, to thereby achieve the target torque.

The target torque in the case where it is necessary to provide the assist force to the hand cart 1 in a traveling direction of the hand cart 1 is a driving torque. On the other hand, the target torque in the case where it is necessary to provide the braking force to the hand cart 1 in a direction opposite to the traveling direction of the hand cart 1 is a braking torque. In this embodiment, it is possible to generate a driving torque and a braking torque each having a desired magnitude and direction by controlling the driving current to be supplied to the electric motors.

A grip sensor 51 is operable to detect a contact of a user with the handle bar 20. The grip sensor 51 comprises a right grip sensor 51a and a left grip sensor 51b, which are embedded, respectively, in the right and left grip portions 22, 24 of the handle bar 20. Each of the right grip sensor 51a and the left grip sensor 51b is a contact sensor for detecting whether or not the user grips a corresponding one of the grip portions 22, 24, and is operable to output a contact detection signal to the control section, individually. As this contact sensor, it is desirable to employ a non-contact proximity sensor based on detection of a change in capacitance. However, it should be understood that a pressure sensing-type sensor based on detection of pressure may also be employed.

The control section 50 is operable to monitor respective contact detection signals received from the right grip sensor 51a and the left grip sensor 51b, and, based on the contact detection signals, to determine a state in which the user grips both of the grip portions 22, 24, a state in which the user grips only one of the grip portions 22, 24, or a state in which the user does not grip any of the grip portions 22, 24. As a result of this determination, when it is determined that both of the grip portions 22, 24 are gripped, the control section 50 operates to execute the aftermentioned assist control. On the other hand, when it is determined that at least one of the grip portions 22, 24 is not gripped, the control section 50 operates to keep from executing the assist control.

A force sensor 52 is installed in a coupling portion between the handle bar 20 and the post 12, to detect a pressure (handle manipulation force) applied from the user to the handle bar 20. The force sensor 52 is operable to detect a magnitude and direction of the handle manipulation force, and output a force detection signal to the control section 50. Specifically, the force sensor 52 is composed of a plurality of pressure sensors installed, respectively, at a plurality of positions. Thus, the control section 50 is operable, based on respective force detection signals from the pressure sensors, to detect a magnitude and direction of force applied to approximately the whole of the handle bar 20.

An inclination sensor 53 is operable to detect an inclination (inclination angle) of the cart body 10 with respect to a horizontal state thereof, and output an inclination angle detection signal to the control section 50. The inclination sensor 53 is configured to detect the inclination angle of the cart body 10, in the form of at least bi-axial data. Specifically, the inclination sensor 53 is configured to detect at least two inclination angles of the cart body 10 in a front-rear direction and a lateral (width) direction thereof.

The inclination sensor 53 is constructed such that it comprises an angular speed sensor and an acceleration sensor. When the cart body 10 is in a rest state, it is possible to detect a direction of gravitational force from a triaxial output of the acceleration sensor, and, based on the direction of gravitational force, calculate the inclination angle of the cart body 10. However, when the cart body 10 is in a traveling state, particularly, in an acceleration/deceleration state, the acceleration sensor receives an inertia force caused by acceleration/deceleration of the cart body 10, in addition to gravitational acceleration. Thus, an inclination angle calculated based only on data from the acceleration sensor undesirably includes error. Therefore, in this embodiment, the inclination sensor 53 is configured to calculate the inclination angle of the cart body 10, based on an angle obtained by integrating output values from the angular speed sensor, and an inclination angle obtained from the acceleration sensor. Further, the control section 50 is operable, when it determines that there is almost no fluctuation in output value of the acceleration sensor, to perform a zero point correction for the angular speed sensor.

A rotational angle sensor 54 is operable to detect a rotational angle of the wheel section 30 and output a rotational angle detection signal to the control section 50. Specifically, the rotational angle sensor 54 is installed to detect respective rotational angles of output shafts of the two driving units 35a, 35b. For example, the rotational angle sensor 54 may be composed of a Hall IC, a rotary encoder or the like built into each of the electric motors of the wheel driving section 35. The control section 50 is operable, based on the rotational angle detection signal, to calculate a rotational speed and a rotational direction of each of the right and left drive wheels 33a, 33b from a rotational angle thereof and further calculate a cart speed, a traveling direction and a movement distance of the hand cart 1.

A torque sensor 55 is operable to detect a torque to be generated by the wheel driving section 35 and output a torque detection signal to the control section 50. The torque sensor 55 is configured to detect the driving current for the electric motors of the wheel driving section 35, and comprises a shunt resistance and an amplifier circuit. The driving current for the electric motors of the wheel driving section 35 corresponds to a torque acting on or generated by the wheel driving section 35. The control section 50 is operable, based on the torque detection signal, to perform the assist control so as to achieve the target torque (target driving torque or target braking torque).

The battery 56 is housed in the battery container 15, and is operable to supply electric power to the control section 50, the wheel driving section 35 and others. For example, the battery 56 is a rechargeable battery such as a lithium-ion battery.

The memory 57 is a storage device for storing therein various data and programs necessary for control by the control section 50. Examples of the data include parameter setting data comprising user-settable parameters, and various loop-up tables.

A communication section 57 is an interface unit for communication with an external device 60.

The external device 60 is a remote controller for allowing a user to change a parameter via a wireless network. The external device 60 may be composed of any one of various wireless communication terminals. The user can wirelessly transmit a setting-change request signal for changing setting of a parameter through the external device 60. Then, the control section 50 is operable, based on the setting-change request signal, to change the parameter in the memory 57.

The braking system 14 is an electronically-controlled braking system capable of mechanically locking and unlocking the wheel section 30. The braking system 14 comprises a braking member, and a motor actuator for displacing the braking member between a lock position and an unlock position. The braking system 14 is operable, in response to receiving a brake locking signal from the control section 50, to displace the braking member to the lock position to hold the wheel section 30 in a locked state, and, in response to receiving a brake unlocking signal from the control section 50, to displace the braking member to the unlock position to set the wheel section 30 to an unlocked state. Thus, the braking system 14 is configured to consume battery power only when the motor actuator is activated to displace the braking member, and keep the battery power from being consumed during a period of maintaining the braking member at the lock position and the unlock position. In this embodiment, the user can set the braking system 14 from a lock state to an unlock state and from the unlock state to the lock state, by operation of a manual lever or the operation panel 40.

Next, an operation of the hand cart 1 according to this embodiment will be described.

First of all, with reference to FIGS. 3A to 3C and FIG. 4, outlines of an assist mode and a braking mode of the hand cart 1 according to this embodiment will be described.

A user can select between an assist mode and a braking mode, according to the parameter setting using the operation panel 40 or the external device 60. The assist mode is a mode of operation during which an assist force $F_A$ toward the traveling direction is imparted to the hand cart 1 so as to assist walking of a user. The assist mode allows the user to carry articles with a relatively small force. On the other hand, the braking mode is a mode of operation during which a braking force $F_B$ is imparted to the hand cart 1 so as to provide a given resistive force to the user. During the braking mode, the user can walk while leaning on the hand cart 1 so as to use the hand cart 1 as support, so that he/she can stably walk.

In the assist mode, when the user applies a pressure $F_H$ (handle manipulation force) to the handle bar 20, a driving torque for moving the hand cart 1 in the forward or backward movement direction is generated in the wheel driving section 35, in such a manner as to impart the assist force $F_A$ (virtual mass adjusting force $F_P$) to the hand cart 1, according to a magnitude and direction of the handle manipulation force $F_H$. The virtual mass adjusting force $F_P$ is a force to be added to allow the user to move the hand cart 1 with a relatively small force, even when a weight of articles loaded on the hand cart 1 is increased. The virtual mass adjusting force $F_P$ is given as a function of the hand manipulation force $F_H$. For example, the control section 50 operates to calculate the virtual mass adjusting force $F_P$ by multiplying the hand manipulation force $F_H$ by an adjustment coefficient $k_P$ (e.g., $k_P=1.5$), and then cause the wheel driving section 35 to generate a driving torque in such a manner as to impart the calculated virtual mass adjusting force $F_P$ to the hand cart 1 ($F_P=k_P \times F_H$). FIGS. 3A and 3B depict, respectively, a state in which the hand cart 1 is moved forwardly and a state in which the hand cart 1 is moved backwardly, during the user-selected assist mode.

Figure 4:
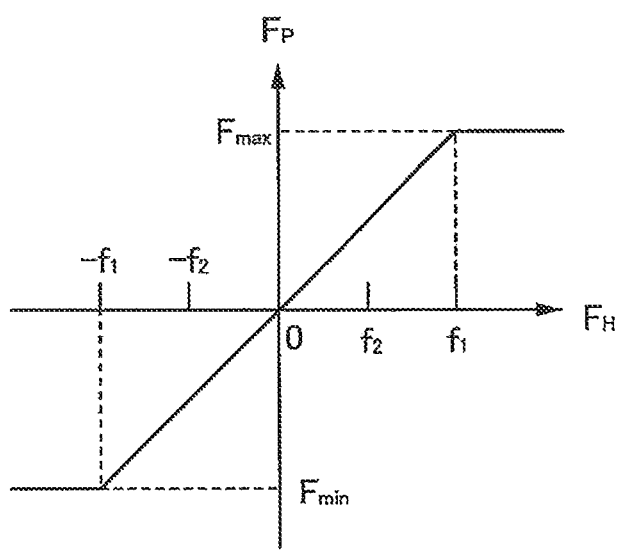
FIG. 4 is a graph depicting a relationship between a pressure against a handle bar and an assist force, in the hand cart according to this embodiment.

FIG. 4 is a graph depicting a relationship between the hand manipulation force $F_H$ and the virtual mass adjusting force $F_P$. In this example, in a range before a hand manipulation force $F_H$ applied in a forward or backward direction of the hand cart 1 reaches a given upper limit value ($f_1$, $-f_1$), as the hand manipulation force $F_H$ applied in the forward direction of the hand cart 1 (cart-forward direction) becomes larger, a virtual mass adjusting force $F_P$ directed in the cart-forward direction becomes larger, and, on the other hand, as the hand manipulation force $F_H$ applied in the backward direction of the hand cart 1 (cart-backward direction) becomes larger, a virtual mass adjusting force $F_P$ (absolute value) directed in the cart-backward direction becomes larger. In FIG. 4, the plus direction means the cart-forward direction, and the minus direction means the cart-backward direction.

In this embodiment, the user can change setting of the adjustment coefficient $k_P$ (i.e., a level of a slope of the characteristic line in FIG. 4) which is an amplification factor (multiplying scale factor) of the virtual mass adjusting force $F_P$ with respect to the hand manipulation force $F_H$, as one parameter ("assist rate"). For example, the assist rate can be selected from "High" (e.g., $k_P=1.8$), "Medium" (e.g., $k_P=1.5$), "Low" (e.g., $k_P=1.2$), and "No Assist" (e.g., $k_P=1.0$).

In FIG. 4, when the hand manipulation force $F_H$ goes beyond a given range ($-f_1 \leq F_H \leq f_1$), the virtual mass adjusting force $F_P$ is limited to a maximum value Fmax or a minimum value Fmin ($=-$Fmax). It should be understood that the relation between the hand manipulation force $F_H$ and the virtual mass adjusting force $F_P$ is not limited to that in FIG. 4, but a dead zone may be provided in a range where the hand manipulation force $F_H$ is relatively small ($-f_2 \leq F_H \leq +f_2$) to allow the assist force to be produced only when the hand manipulation force $F_H$ is equal to or greater than a given absolute value.

As depicted in FIG. 3A, when the user is walking on a flat road forwardly while pushing the hand cart 1, the force sensor 52 outputs a force detection signal indicative of the hand manipulation force $F_H$ applied in the cart-forward direction. In response to receiving this force detection signal, the control section 50 operates to detect a magnitude and direction (cart-forward direction) of the detected hand manipulation force $F_H$, and then cause the wheel driving section 35 to generate a driving torque in such a manner as to add a virtual mass adjusting force $F_P$ according to the hand manipulation force $F_H$ to the hand cart 1. As a result, an assist force $F_A$ ($=F_P$) directed in the cart-forward direction is produced in the hand cart 1.

As depicted in FIG. 3B, when the user is walking on a flat road backwardly while pulling the hand cart 1, the force sensor 52 outputs a force detection signal indicative of the hand manipulation force $F_H$ applied in the cart-backward direction. In response to receiving this force detection signal, the control section 50 operates to detect a magnitude and direction (cart-backward direction) of the detected hand manipulation force $F_H$, and then cause the wheel driving section 35 to generate a driving torque in such a manner as to add a virtual mass adjusting force $F_P$ according to the hand manipulation force $F_H$ to the hand cart 1. As a result, an assist force $F_A$ ($F_P$) directed in the cart-backward direction is produced in the hand cart 1.

As above, in the assist mode, when the handle bar 20 is pushed (or pulled) in the traveling direction, the assist force $F_A$ ($=F_P$) according to the hand manipulation force $F_H$ applied by the user is imparted to the hand cart 1, so that the user can walk while moving the hand cart 1 with a relatively small hand manipulation force $F_H$.

During the braking mode, when the user applies the hand manipulation force $F_H$ to the handle bar 20 to cause the hand cart 1 to travel, a braking torque for giving a given braking force $F_B$ to the user is generated in the wheel driving section 35. In this embodiment, the braking mode becomes effective only during forward movement on a flat road or downward slope.

As depicted in FIG. 3C, when the user pushes the hand cart 1 on a flat road to move it forwardly during the user-selected braking mode, the control section 50 operates to drive the wheel driving section 35 in such a manner as to generate a flat-road set braking force $F_{D1}$ selected by parameter setting, as the braking force $F_B$. As a result, a given resistive force is produced in the hand cart 1, and thereby the user can walk while using the hand cart 1 as support and receiving a given braking force $F_B$ from the hand cart 1. During the braking mode, the output of the force sensor 52 is invalidated. That is, during the braking mode, the virtual mass adjusting force $F_P$ based on the hand manipulation force $F_H$ is not produced.

During the braking mode, the hand cart 1 is not moved unless the hand cart 1 is pushed by a force capable of overcoming a given resistive force (flat-road set braking force $F_{D1}$). That is, during a period where the user pushes the handle bar 20 by a hand manipulation force $F_H$ less than the given resistive force, the control section 50 operates to control the braking torque to be generated by the wheel driving section 35, in such a manner that the cart speed becomes zero (zero-speed control). That is, in the zero-speed control, the control section 50 operates to cause the wheel driving section 35 to generate a braking torque in such a manner that the rotational speed of the wheel section 30 calculated based on the rotational angle detection signal becomes zero, under feedback control. Thus, when the hand manipulation force $F_H$ is relatively small, a braking force having the same magnitude as that of a hand manipulation force $F_H$ pushingly applied by the user is produced in a direction opposite to that of the hand manipulation force $F_H$. However, the braking force is limited to the flat-road set braking force $F_{D1}$. That is, even when the hand manipulation force $F_H$ pushingly applied by the user becomes greater than the given resistive force ($F_{D1}$), the braking torque to be generated by the wheel driving section 35 is maintained to produce the flat-road set braking force $F_{D1}$. Thus, the user can move the hand cart 1 in the traveling direction (cart-forward direction) while feeing the given resistive force ($F_{D1}$).

Next, with reference to FIGS. 5A to 5D and FIG. 6, an outline of an assist control during movement on a sloped road, in the hand cart 1 according to this embodiment, will be described.

Based on an inclination angle detection signal received from the inclination sensor 53, the control section 50 operates to detect the front-rear directional inclination angle of the cart body 10. Through this operation, the control section 50 determines that the hand cart 1 is located on a sloped road having an inclination angle θ. Further, based on a rotational angle detection signal received from the rotational angle sensor 54, the control section 50 operates to determine a traveling direction (i.e., forward or backward movement direction) of the hand cart 1.

Figure 5A:
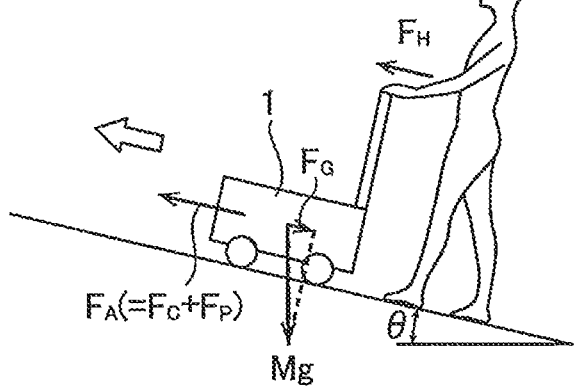
FIGS. 5A to 5D are explanatory diagrams of a control during movement on a sloped road, in the hand cart according to this embodiment.
Figure 5B:
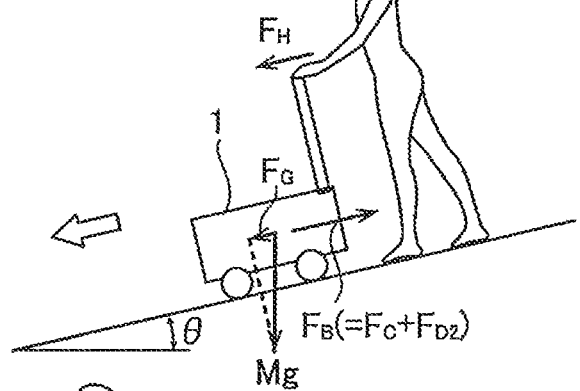
Figure 5C:
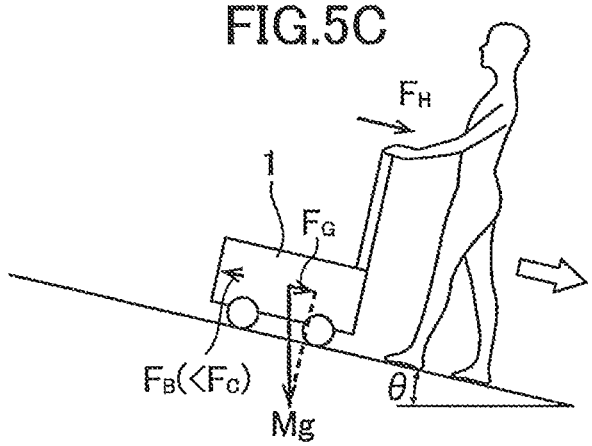
Figure 5D:
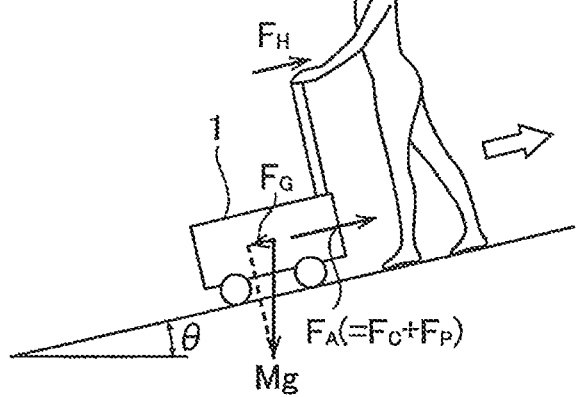
Figure 6:
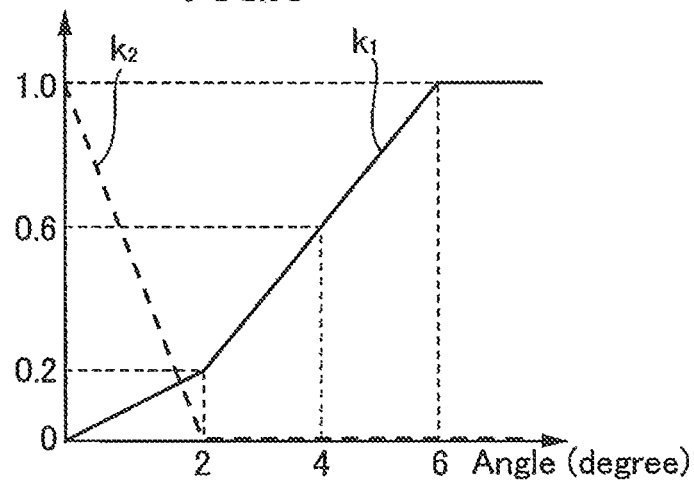
FIG. 6 is a graph depicting a relationship between an inclination angle and a correction coefficient during forward traveling on a downward slope, in the hand cart according to this embodiment.

Then, according to the determined traveling direction and inclination angle, the control section 50 operates to determine in which of states depicted in FIGS. 5A to 5D the hand cart 1 is situated, and then execute an assist control of generating an assist torque or braking torque suitable for the determined state. Specifically, FIG. 5A and FIG. 5B depict, respectively, a state in which the user is walking on a sloped road (inclination angle θ) upwardly while moving the hand cart 1 forwardly, and a state in which the user is walking on a sloped road downwardly while moving the hand cart 1 forwardly, and FIG. 5C and FIG. 5D depict, respectively, a state in which the user is walking on a sloped road downwardly while moving the hand cart 1 backwardly, and a state in which the user is walking on a sloped road upwardly while moving the hand cart 1 backwardly.

In any of the four states, according to gravitational force, a gravitational force-component $F_G$(=Mg·sin θ) is applied to the hand cart 1 downwardly along the sloped road. In this case, M, g and θ denote, respectively, a weight of the hand cart 1, a gravitational acceleration, and an inclination angle of the sloped road.

The weight of the hand cart 1 is increased when articles are loaded thereon. Thus, the weight may be corrected according to such an increase thereof. For example, the hand cart 1 may constructed such that it is provided with a weight sensor, wherein a corrected weight obtained by adding a weight of articles detected by the weight sensor to an initial weight of the hand cart 1 is defined as the weight M of the hand cart 1, or a weight of articles to be added can be input from the operation panel 40.

In the state depicted in FIG. 5A, the control section 50 operates to perform an assist control to cause the wheel driving section 35 to generate a driving torque in such a manner as to impart, to the hand cart 1 in the traveling direction, a gravitational compensation force $F_C$ (=−$F_G$) capable of counterbalancing a gravitational force-component $F_G$, as the assist force $F_A$. The gravitational force-component $F_G$ and the gravitational compensation force Fe are vector quantities having the same magnitude and opposite directions.

Further, during the user-selected assist mode, a virtual mass adjusting force $F_P$ according to a hand manipulation force $F_H$ detected by the force sensor 52 in response to pushing of the handle bar 20 by the user is added as an additional assist force to the assist force $F_A$ ($F_A$=$F_C$+$F_P$). Thus, despite that the user is walking on the sloped road upwardly, he/she can walk while moving the hand cart 1 by a relatively small hand manipulation force $F_H$, in the same manner as that on a flat road (θ=0°).

In the operation for calculating the assist force $F_A$, instead of directly using the gravitational compensation force $F_C$, a corrected value thereof may be used. For example, the control section 50 may be configured to add a preset correction force (having a positive, zero or negative value) to the gravitational compensation force $F_C$ to thereby correct the gravitational compensation force $F_C$. In this case, as the assist force not involving the virtual mass adjusting force $F_P$, it is possible to impart, to the hand cart 1, the assist force less than the gravitational compensation force $F_C$, the assist force equal to the gravitational compensation force $F_C$, or the assist force greater than the gravitational compensation force $F_C$. This makes it possible to improve usability and safety of the hand cart 1 according to leg strength or the like of a user.

In the state depicted in FIG. 5B, the control section 50 operates to perform an assist control to cause the wheel driving section 35 to generate a driving torque in such a manner as to impart a braking forcer $F_B$ greater than a gravitational compensation force $F_C$ capable of counterbalancing a gravitational force-component $F_G$. The braking forcer $F_B$ is a force obtained by adding a downward-slope set braking force $F_{D2}$ to the gravitational compensation force $F_C$ ($F_B$=$F_C$+$F_{D2}$). The downward-slope set braking force $F_{D2}$ is a value to be selected by parameter setting, e.g. $F_{D2}$=50 N.

Thus, in this embodiment having the above feature, even when the user leans on the handle bar 20 during downward movement on a sloped road, the user is supported by the downward-slope set braking force $F_{D2}$ as the given resistive force. Supposing that the braking force $F_B$ does not comprise the downward-slope set braking force $F_{D2}$, when the user leans on the handle bar 20, the hand cart 1 is pushed downwardly accordingly. In this situation, the user is left behind, and only the hand cart 1 travels ahead of the user. Thus, the user is liable to fall over. Therefore, in this embodiment, with a view to preventing such falling-over of a user on a downward slope, the braking force $F_B$ is set to a value obtained by adding the downward-slope set braking force $F_{D2}$ to the gravitational compensation force $F_C$, instead of the gravitational compensation force $F_C$ itself.

Considering safety, in this embodiment, when the hand cart 1 is moved on a downward slope downwardly, the output of the force sensor 52 is invalidated, even during the user-selected assist mode, to prevent imparting of the assist force (virtual mass adjusting force $F_P$) according to the hand manipulation force $F_H$.

In this embodiment, when the hand cart 1 is moved on a downward slope downwardly during the user-selected braking mode, a larger one of the downward-slope set braking force $F_{D2}$ and the flat-road set braking force $F_{D1}$ is selected. That is, in the case where the downward-slope set braking force $F_{D2}$ is equal to or greater than the flat-road set braking force $F_{D1}$ ($F_{D2} \geq F_{D1}$), the braking force $F_B$ is calculated by adding the downward-slope set braking force $F_{D2}$ to the gravitational compensation force $F_C$. On the other hand, in the case where the flat-road set braking force $F_{D1}$ is greater than the downward-slope set braking force $F_{D2}$ ($F_{D2}<F_{D1}$), the braking force $F_B$ is calculated by adding, to the gravitational compensation force $F_C$, the flat-road set braking force $F_{D1}$ instead of the downward-slope set braking force $F_{D2}$.

Further, in the case where the control section 50 determines that the hand manipulation force $F_H$ is applied downwardly along the sloped road, the control section 50 operates, when the hand manipulation force $F_H$ pushed by the user is equal to or less than the downward-slope set braking force $F_{D2}$ (or the flat-road set braking force $F_{D1}$ when $F_{D2}<F_{D1}$), to execute the zero-speed control to allow the cart speed to become zero so as to stop the hand cart 1 on the sloped road, as with the braking mode to be performed on a flat road. On the other hand, when the hand manipulation force $F_H$ is greater than the downward-slope set braking force $F_{D2}$ (or the flat-road set braking force $F_{D1}$ when $F_{D2}<F_{D1}$), the user can push the hand cart 1 forwardly while receiving a resistive force based on the braking force $F_B$ ($F_C+F_{D2}$ or $F_C+F_{D1}$).

Further, during the user-selected assist mode, when the hand cart 1 is moved on a downward slope having a relatively small inclination angle θ (e.g., 0°≤θ<6°), the downward-slope set braking force $F_{D2}$ is corrected in the following manner so as to smoothly make a transition of the assist control between on a flat road (θ=0°) and the downward slope. That is, as indicated by the solid line in FIG. 6, the downward-slope set braking force $F_{D2}$ is multiplied by a braking force correction coefficient $k_1$, according to the inclination angle θ. In the example depicted in FIG. 6, the braking force correction coefficient $k_1$ decreases gradually and linearly from 1.0 to 0.2 when the inclination angle θ changes from 6° to 2°. Thus, as the inclination angle θ becomes smaller, a value of a resistive force ($k_1 \times F_{D2}$) to be added to the gravitational compensation force $F_C$ becomes smaller ($F_B=F_C+k_1 \times F_{D2}$).

A road having an inclination angle θ ranging from 2° to 0° can be almost considered as a flat road. Thus, in this embodiment, when the inclination angle θ is in this range, a weighted average value of the downward-slope set braking force $F_{D2}$ and the virtual mass adjusting force $F_P$ is added to the gravitational compensation force $F_C$. Thus, in this inclination angle range, as an exception in the control during downward movement on the sloped road, a certain assist force is produced according to the hand manipulation force $F_H$. Specifically, when the inclination angle θ decreases from 2° to 0°, the correction coefficient $k_1$ of the downward-slope set braking force $F_{D2}$ decreases gradually and linearly from 0.2 to 0.0, whereas an assist correction coefficient $k_2$ (broken line in FIG. 6) by which the virtual mass adjusting force $F_P$ is to be multiplied increases gradually and linearly from 0.0 to 1.0. Thus, in this inclination angle range, the braking force $F_B$ is calculated as follows: $F_B=F_C+k_1 \times F_{D2}-k_2 \times F_P$. It is to be understood that a negative braking force $F_B$ means an assist force. Thus, when the user is walking on a road which comprises a flat road and a mildly sloped road having a relatively small inclination angle θ and being continuous with the flat road, he/she can walk while feeling the assist force and the braking forcer without having a feeling of strangeness.

In the state depicted in FIG. 5C, the control section 50 operates to perform an assist control to cause the wheel driving section 35 to generate a braking torque in such a manner as to impart a braking forcer $F_B$ less than a gravitational compensation force $F_C$ capable of counterbalancing a gravitational force-component $F_G$. The braking forcer $F_B$ is derived from multiplying the gravitational compensation force $F_C$ by a downward-slope braking coefficient $k_D$ ($0<k_D<1$). The downward-slope braking coefficient $k_D$ is a value to be selected by parameter setting, e.g. $k_D=2/3$.

If the braking force $F_B$ is set to be equal to or greater than the gravitational compensation force $F_C$, there arises a risk of causing falling-over of the user. That is, such a setting is likely to cause a situation where the hand cart 1 is stopped on the sloped road. Thus, if the user pulls the handle bar 20 by the hand manipulation force $F_H$, the hand cart 1 is undesirably rotated about the rear wheels, resulting in a risk that the user loses support and falls over. Therefore, in this embodiment, the braking force $F_B$ is set to be less than the gravitational compensation force $F_C$, in such a manner that the hand cart 1 automatically moved downwardly when the user pulls the handle bar 20 by a relatively small hand manipulation force $F_H$.

In this embodiment, when the hand cart 1 is moved on an upward slope backwardly (FIG. 5C), the output of the force sensor 52 is invalidated, even during the user-selected assist mode, to prevent imparting of the assist force (virtual mass adjusting force $F_P$) according to the hand manipulation force $F_H$.

In the state depicted in FIG. 5D, the control section 50 operates to perform an assist control to cause the wheel driving section 35 to generate a driving torque in such a manner as to impart, to the hand cart 1 in the traveling direction, a gravitational compensation force $F_C$ capable of counterbalancing a gravitational force-component $F_G$, as the assist forcer $F_A$.

Further, during the user-selected assist mode, a virtual mass adjusting force $F_P$ according to a hand manipulation force $F_H$ detected by the force sensor 52 in response to pulling of the handle bar 20 by the user is added to the assist force $F_A$ ($F_A=F_C+F_P$). Thus, despite that the user is walking on the sloped road upwardly, he/she can walk while moving the hand cart 1 by a relatively small hand manipulation force $F_H$, in the same manner as that on a flat road.

Further, as with the control in the state depicted in FIG. 5A, in the operation for calculating the assist force $F_A$ a corrected value of the gravitational compensation force $F_C$ may be used. In this case, as the assist not involving the virtual mass adjusting force $F_P$, it is possible to impart, to the hand cart 1, the assist force less than the gravitational compensation force $F_C$, the assist force equal to the gravitational compensation force $F_C$, or the assist force greater than the gravitational compensation force $F_C$.

In the case where the hand cart 1 is located on the sloped road in the postures depicted in FIGS. 5A and 5C, the control section 50 operates, based on the inclination angle detection signal received from the inclination sensor 53, to determine that the hand cart 1 is in a backwardly-inclined posture where a front end thereof is located above a rear end thereof. Further, in this posture, when the user applies the hand manipulation force $F_H$ to the handle bar 20, the control section 50 operates, based on the force detection signal received from the force sensor 52, to determine the direction of the hand manipulation force Fu. Based on the determination, the control section 50 operates, when the hand manipulation force $F_H$ is determined to be oriented in the cart-forward direction, to perform an assist control to produce the assist force $F_A$ as described with reference to FIG. 5A, and, when the hand manipulation force $F_H$ is determined to be oriented in the cart-backward direction, to perform an assist control to produce the braking force $F_B$ as described with reference to FIG. 5C. Thus, when the hand manipulation force $F_H$ is applied to the hand cart 1 in a stopped state, the control section 50 can appropriately make a transition to the assist control as described with reference to FIG. 5A or FIG. 5C.

On the other hand, in the case where the hand cart 1 is located on the sloped road in the postures depicted in FIGS. 5B and 5D, the control section 50 operates, based on the inclination angle detection signal received from the inclination sensor 53, to determine that the hand cart 1 is in a forwardly-inclined posture where the front end thereof is located below the rear end thereof. Further, in this posture, when the user applies the hand manipulation force $F_H$ to the handle bar 20, the control section 50 operates, based on the force detection signal received from the force sensor 52, to determine the direction of the hand manipulation force $F_H$. Based on the determination, the control section 50 operates, when the hand manipulation force $F_H$ is determined to be oriented in the cart-forward direction, to perform an assist control to produce the braking force $F_B$ as described with reference to FIG. 5B, and, when the hand manipulation force $F_H$ is determined to be oriented in the cart-backward direction, to perform an assist control to produce the assist force $F_A$ as described with reference to FIG. 5D. Thus, when the hand manipulation force $F_H$ is applied to the hand cart 1 in the stopped state, the control section 50 can appropriately make a transition to the assist control as described with reference to FIG. 5B or FIG. 5D.

Figure 7:
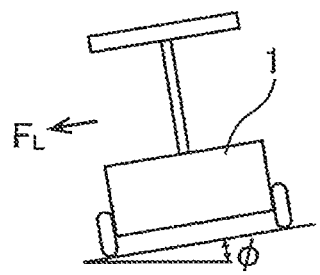
FIG. 7 is an explanatory diagram of a control during movement on a laterally sloped road, in the hand cart according to this embodiment.
Figure 8:
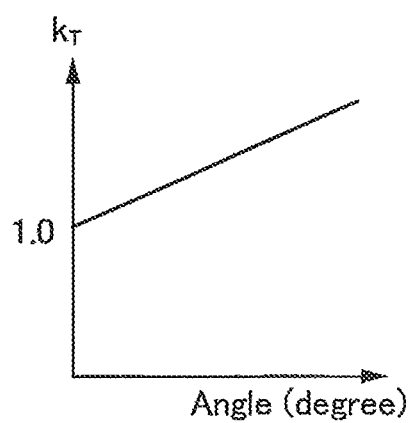
FIG. 8 is a graph depicting a relationship between an inclination angle of a laterally sloped road and a torque correction coefficient, in the hand cart according to this embodiment.

Next, with reference to FIGS. 7 and 8, a trajectory-deviation suppression control to be executed when the hand cart 1 according to this embodiment is moved on a road having a lateral slope. FIG. 7 depicts a state in which the hand cart 1 is moved on a road having a lateral slope inclined in the lateral direction (inclination angle $\phi$). In this state, the hand cart 1 receives a lateral force $F_L$ in a direction from the highest edge to the lowest edge of the road. In this embodiment, with a view to suppress the occurrence of a situation where a trajectory of the hand cart 1 is unexpectedly deviated toward the lowest edge of the road due to the lateral force $F_L$ caused by the lateral slope, the trajectory-deviation suppression control is executed.

In the trajectory-deviation suppression control, the control section 50 operates, based on the inclination angle detection signal received from the inclination sensor 53, to detect a lateral inclination angle $\phi$, and, based on the detected inclination angle $\phi$, to select one of the driving units for driving one of the drive wheels located on the side of the lowest edge of the road. Then, the control section 50 operates to correct a target torque to be generated by the selected driving unit, by a torque correction coefficient $k_T$ indicated in FIG. 8. Specifically, the control section 50 operates to calculate a corrected torque by multiplying, by the torque correction coefficient $k_T$, a target torque (driving torque or braking torque) calculated on the assumption that the inclination angle $\phi$ is zero. In the example depicted in FIG. 8, the torque correction coefficient $k_T$ is set such that it increases linearly or non-linearly according to a magnitude (absolute value) of the inclination angle $\phi$. Specifically, torque correction coefficient $k_T$ is 1.0 when the inclination angle $\phi$ is 0°, and gradually increases along with an increase in the inclination angle $\phi$.

Thus, the control section 50 operates to drive one of the right and left driving units 35a, 35b in such a manner as to achieve the normal target torque (inclination angle $\phi$=0°), and drive the other driving unit in such a manner as to achieve the corrected torque. As above, the right and left driving units are controlled independently of each other to generate respective different torques according to the inclination angle $\phi$. Through the trajectory-deviation suppression control, a larger torque (driving torque or braking torque) is produced in the drive wheel located on the side of the lowest edge of the road. In this embodiment, the trajectory-deviation suppression control makes it possible to suppress the occurrence of a situation where, during traveling on a road having a lateral slope, the hand cart 1 deviates toward the lowest edge side of the sloped road, and thus move the hand cart 1 in a traveling direction intended by a user.

Figure 9:
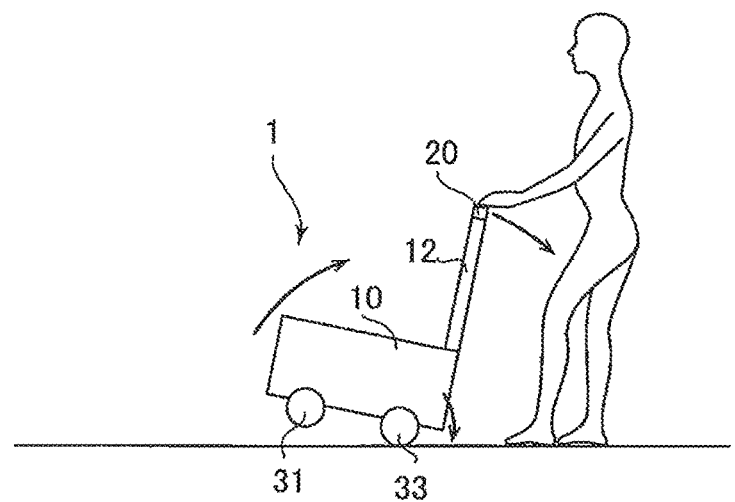
FIG. 9 is an explanatory diagram of a falling-over prevention function of the hand cart according to this embodiment.

Next, with reference to FIG. 9, a falling-over prevention control in the hand cart 1 according to this embodiment will be described.

The hand cart 1 according to this embodiment is configured such that the assist force is added thereto in the state depicted in FIG. 5A, as mentioned above. However, as depicted in FIG. 9, there is a risk that, when a user leans on the handle bar 20, the driven wheels 31 are floated from the ground while the drive wheels 33 are kept in contact with the ground, and the hand cart 1 is undesirably rotated backwardly about the drive wheels 33 ("wheelie state").

This state is not distinguishable from a state in which the hand cart 1 is moved on a sloped surface forwardly and upwardly as in the state depicted in FIG. 5A, because the cart body 10 is inclined, and the drive wheels 33 are rotated in the forward movement direction. Therefore, the assist force could be added to the hand cart 1. However, if the assist force were added in the state depicted in FIG. 9, the hand cart 1 would be moved forwardly and away from the user, thereby causing a risk of falling-over of the user leaning on the handle bar 20.

In this embodiment, with a view to preventing unintended generation of the assist force, the falling-over prevention control is executed. Specifically, in this embodiment, the control section 50 operates to calculate an angular change in inclination angle per unit movement distance, from a movement distance of the cart body 10 calculated based on the rotational angle detection signal, and the front-rear directional inclination angle of the cart body 10 calculated based on the inclination angle detection signal.

When this angular change rate is equal to or less than a given threshold (e.g., 0.75°/cm), the control section 50 operates to perform the assist control to impart the assist force and the braking force according to the traveling direction and the inclination angle of the cart body 10 as described with reference to FIGS. 5A to 5D. On the other hand, when the angular change rate is greater than the given threshold (when the wheelie state is detected), the control section 50 operates to keep from executing the above assist control. Specifically, a gravitational compensation force $F_C$ based on an inclination angle just before the angular change rate is determined to become greater than the given threshold is maintained as the assist force, and the function of adding the virtual mass adjusting force $F_P$ based on the hand manipulation force $F_H$ is disabled even during the user-selected assist mode.

Thus, in this embodiment, when the hand cart 1 falls into the wheelie state, the wheel driving section 35 is controlled to successively generate only an assist force corresponding to the gravitational compensation force just before detection of the wheelie state. This makes it possible to prevent the hand cart 1 from unexpectedly traveling forwardly and thus prevent falling-over of the user.

The hand cart 1 according to this embodiment is configured such that, when the user manually operates a given release switch (not depicted) or when it is detected, based on the rotational angle detection signal, that the drive wheels 33 have moved over a given distance (e.g., 1 m), after start of execution of the falling-over prevention control, the falling-over prevention control is released, and the control routine is returned to the normal assist control.

The falling-over prevention control in this embodiment may be modified as follows. Specifically, when the wheelie state is detected, the zero-speed control may be executed to generate a braking torque to allow the rotational speed of the wheel section 30 to become zero. In this modified embodiment, when the wheelie state is detected, the drive wheels 33 are maintained in a stopped state, and thus the user can use the handle bar 20 as support, so that it becomes possible to more reliably prevent falling-over of the user.

Further, in the above embodiment, a switch for disabling generation of the assist force may be additionally provided. For example, in the case where it is necessary to lift the front wheels so as to get over a step, the user can preliminarily manually operates the switch to thereby temporarily disable an assist force to be added when the hand cart 1 is moved on a sloped road forwardly and upwardly. This makes it possible to reduce a risk of falling-over or off-balance.

Next, with reference to FIG. 10, an overspeed suppression control and an overacceleration suppression control in the hand cart 1 according to this embodiment will be described.

Figure 10:
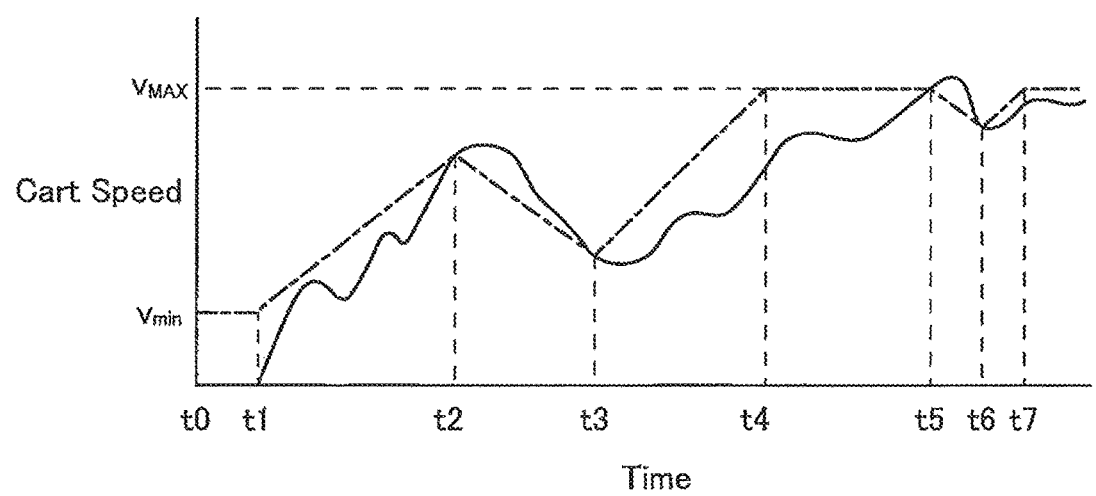
FIG. 10 is a graph depicting a temporal change in a cart speed and a target speed, in the hand cart according to this embodiment.

FIG. 10 depicts a temporal change in cart speed va (solid line) of the hand cart 1 calculated from the rotational angle detection signal, and a temporal change in target speed vt (one-dot chain line). The control section 50 operates, when it detects that the hand cart 1 is shifted from a stopped state (time t0 to time t1) to a forward movement state (time t1), to increase the target speed vt from a given lower limit speed vmin over time, with an acceleration limit a (time t1 to time t2). The lower limit speed vmin is a safety margin for preventing erroneous determination. The cart speed va is an average value of cart speeds calculated from the rotational speeds of the drive wheels 33a, 33b.

The control section 50 operates to compare the cart speed va with the target speed vt, and, when the cart speed va is equal to or less than the target speed vt, to continue the increase of the target speed vt. On the other hand, when the cart speed va becomes greater than the target speed vt (time t2), the control section 50 operates to determine that there occurs an overacceleration state in which an actual acceleration of the cart speed va exceeds the acceleration limit a. The control section 50 operates, upon determining the occurrence of the overacceleration state, to rapidly reduce the target speed vt over time, with a given negative acceleration b, and control the wheel driving section 35 to generate a braking torque according to a speed difference between the target speed vt being gradually reduced and the cart speed va (time t2 to time t3). As a result of the overacceleration suppression control, the cart speed va is reduced to the target speed vt (time t3). For example, in a situation where a user stumbles on a road, the overacceleration occurs. Thus, in this embodiment, when the overacceleration occurs, the hand cart 1 can be decelerated to support the user to thereby prevent falling-over of the user.

When the cart speed va becomes equal to or less than the target speed vt, the control section 50 operates to increase the target speed vt with the acceleration limit a again (time t3 to time t4). When the target speed vt reaches an upper limit speed vmax (e.g., 6 km/h) (time t4), the control section 50 operates to stop the increase of the target speed vt and maintain the target speed vt at the upper limit speed vmax (time t4 to time t5). Further, when the cart speed va becomes greater than the target speed vt equal to the upper limit speed vmax (time t5), the control section 50 operates to determine that there occurs an overspeed state. The control section 50 operates, upon determining the occurrence of the overspeed state, to reduce the target speed vt with the acceleration b, and cause the wheel driving section 35 to generate the given braking torque, in the same manner as that in the processing after the determination of the occurrence of the overacceleration state (time t5 to time t6). Then, when the cart speed va is reduced to the target speed vt (time t6), the control section 50 operates to increase the target speed vt with the acceleration limit a again (time t6 to time t7) to allow the target speed vt to reach the upper limit speed vmax (time t7).

As a result of the overspeed suppression control, the cart speed va is maintained around the upper limit speed vmax. For example, in a situation where the user unwittingly walks beyond the upper limit speed vmax set by the user, the cart speed va is controlled to converge to the upper limit speed vmax by the overspeed suppression control. This makes it easier for the user to walk at a stable speed.

As above, in this embodiment, a user can set the upper limit speed vmax and the acceleration limit a so as to suppress unexpected or sudden starting and overspeed of the hand cart 1. Further, in a hand cart designed on the assumption that it is moved on a road at low speeds, if the overacceleration state were detected by comparing an acceleration detected by an acceleration sensor of which detection signal is highly likely to include a noise component caused by vibration of a cart body or the like, with a threshold such as the acceleration limit, detection accuracy would be deteriorated. Differently, in this embodiment, the occurrence of the overacceleration state is determined by comparing the target speed vt which increases with the acceleration limit a, with the cart speed va based on the rotational angle detection signal. This makes it possible to improve the detection accuracy of the overacceleration state.

In this embodiment, during forward movement of the hand cart 1, the overspeed suppression control and the overacceleration suppression control are executed. On the other hand, during backward movement of the hand cart 1, only the overspeed suppression control is executed.

Next, an operation of the grip sensor 51 in this embodiment will be described.

In this embodiment, the control section 50 is configured to monitor the contact detection signals received from the right grip sensor 51a and the left grip sensor 51b, and, when it is determined that both of the grip portions 22, 24 are gripped based on the contact detection signals, to execute the assist control described with reference to FIGS. 5A to 5D.

On the other hand, in this embodiment, when it is determined that none of the grip portions 22, 24 is gripped, the control section 50 operates to execute the zero-speed control of generating a braking torque to allow the rotational speed of the wheel section 30 to become zero. Thus, in the hand cart 1 according to this embodiment, it becomes possible to, when a user releases both hands from the handle bar 20, automatically decelerate the hand cart 1 and then maintain the hand cart 1 in a stopped state.

Further, the control section 50 operates, when it determines that a non-gripped state of both of the grip portions 22, 24 continues for a given period of time (e.g., 3 minutes), to output a brake lock signal to the braking system 14 to hold the wheel section 30 in the locked state, and terminate the zero-speed control to stop the torque generation by the wheel driving section 35. That is, in the hand cart 1 according to this embodiment, it becomes possible to, when a given time has elapsed after release of both hands of the user from the handle bar 20, automatically lock the wheel section 30 by the braking system 14. In this embodiment, the braking system 14 is configured to consume electric power only during switching between the lock state and the unlock state, as mentioned above. Thus, electric power of the battery 56 is not consumed during a period when the braking system 14 is maintained in the lock state.

In this embodiment, for example, even when a user releases his/her hands from the handle bar 20 of the hand cart 1 located on a sloped road, the hand cart 1 is maintained in a state in which it is stopped on the sloped road. In this situation, a certain torque is generated in the wheel driving section 35, and, for this purpose, an excitation current will be continuously supplied to the electric motors. Thus, while the hand cart 1 is left on the sloped road, a remaining amount of the battery 56 would be gradually reduced, and finally become failing to maintain the torque. Differently, in this embodiment, after an elapse of a given time, the braking system 14 automatically locks the wheel section 30, and the zero-speed control is terminated, as mentioned above. This makes it possible to prevent unwanted consumption of electric power of the battery 56 during the period when the hand cart 1 is left unattended.

In this embodiment, as to a control to be executed when it is detected that only one of the grip portions 22, 24 is gripped, the user can select one of a plurality of options. For example, the user can select one of a zero-speed control mode and a virtual mass adjustment disabling mode.

In the zero-speed control mode, the control section 50 operates, when a contact is detected by only one of the right grip sensor 51a and the left grip sensor 51b, to execute the zero-speed control of generating a braking torque to allow the rotational speed of the wheel section 30 to become zero. For example, in a situation where the user grips the handle bar 20 by one hand and stretches the other hand toward goods during shopping, there is a risk that an unintended pressure is applied to the handle bar 20, causing movement of the hand cart 1. In this embodiment, the zero-speed control mode makes it possible to prevent such unintended movement.

In the virtual mass adjustment disabling mode, the control section 50 operates, when a contact is detected by only one of the right grip sensor 51a and the left grip sensor 51b, to, during the user-selected assist mode, disable assist based on the virtual mass adjusting force $F_P$ to be generated according to the hand manipulation force $F_H$. In this mode, even when one user's hand gripping the handle bar 20 applies an unintended pressure to the handle bar 20, the assist based on the virtual mass adjusting force $F_P$ is disabled. Thus, in this embodiment, the virtual mass adjustment disabling mode makes it possible to prevent the hand cart 1 from unexpectedly traveling.

Next, a wheel stop control in this embodiment will be described.

In this embodiment, the control section 50 operates to monitor the front-rear directional and lateral inclination angles (θ, φ) of the cart body 10 detected based on the inclination angle detection signal, and, when one of the inclination angles becomes greater than a given falling-over criterion angle (e.g., 60°), to determine that the hand cart 1 has overturned. Then, when it is determined that the hand cart 1 has overturned, the control section 50 operates to stop the rotation of the wheel section by the above zero-speed control. This makes it possible to prevent the occurrence of a situation where, after the overturn or during storage of the hand cart 1 in an overturned state, the wheel driving section 35 is continuously operated to needlessly consume electric power of the battery 56.

Next, with reference to FIG. 11, a low state-of-charge control in the hand cart 1 according to this embodiment will be described.

The hand cart 1 according to this embodiment is driven by the battery 56, and therefore a state-of-charge (SOC) of the battery 56 is gradually lowered from a fully charged state. The hand cart 1 according to this embodiment is configured to execute a low state-of-charge control to prevent the occurrence of a situation where it becomes unable to provide sufficient walking assist due to such lowering of the state-of-charge of the battery 56.

In the low state-of-charge control, the control section 50 operates to continually detect the state-of-charge of the battery using a detection device (not depicted). The control section 50 operates to determine whether or not the state-of-charge is greater than a first state-of-charge threshold $C_{th1}$. When the state-of-charge is greater than the first state-of-charge threshold $C_{th1}$, the control section 50 operates to execute the normal assist control. On the other hand, when the state-of-charge becomes equal to or less than the first state-of-charge threshold $C_{th1}$, the control section 50 operates to execute a driving torque reduction control.

In the driving torque reduction control, the control section 50 operates to determine whether a torque to be output by the wheel driving section 35 is a driving torque for generating the assist force or a braking torque for generating the braking force. When the torque to be output is the braking torque, the control section 50 operates to keep from changing the target torque. On the other hand, when the torque to be output is the driving torque, the control section 50 operates to correct the target torque by a torque reduction correction coefficient $k_C$.

Figures 11, 12:
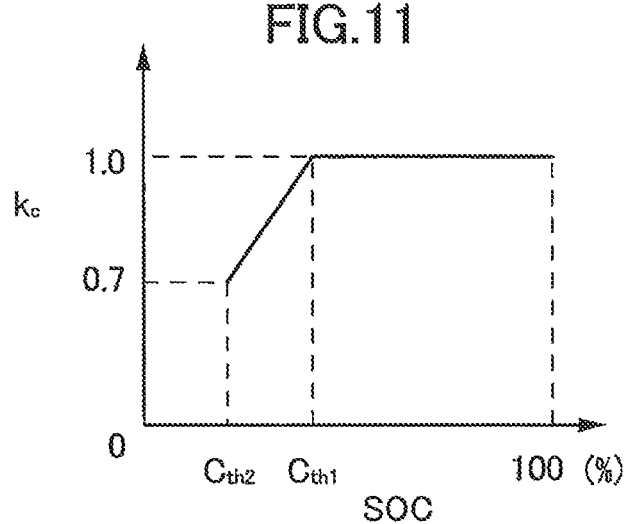
FIG. 11 is a graph depicting a temporal change in a cart speed and a target speed, in the hand cart according to this embodiment.
FIG. 12 is an explanatory diagram of an automatic parameter setting mode of the hand cart according to this embodiment.

FIG. 11 is a graph depicting a relationship between the state-of-charge and the torque reduction correction coefficient $k_C$. The torque reduction correction coefficient $k_C$ is set in the following range according to the state-of-charge:

$0 < k_C < 1$. In the example depicted in FIG. 11, the torque reduction correction coefficient $k_C$ is set such that it is kept in 1 when the state-of-charge is from 100% to the first state-of-charge threshold $C_{th1}$, and is linearly lowered when the state-of-charge gradually changes from the first state-of-charge threshold $C_{th1}$ to a second state-of-charge threshold $C_{th2}$ ($0 < C_{th2} < C_{th1}$). When the state-of-charge reaches the second state-of-charge threshold $C_{th2}$, the torque reduction correction coefficient $k_C$ becomes 0.7, for example.

Thus, when the state-of-charge is lowered between the first state-of-charge threshold $C_{th1}$ and the second state-of-charge threshold $C_{th2}$, the driving torque (thus, the assist force) is reduced with respect to a value in the fully charged state or in a state in which the state-of-charge is equal to or greater than the first state-of-charge threshold $C_{th1}$, although the braking torque (thus, the braking force) is maintained at the same value as that in the fully charged state or in the state in which the state-of-charge is equal to or greater than the first state-of-charge threshold $C_{th1}$.

The braking force required for the hand cart 1 has a high degree of importance in terms of safety to prevent falling-over of a user during use. Therefore, in this embodiment, even in a low state-of-charge state, the braking forcer is maintained. On the other hand, the assist force has a lower degree of importance in terms of safety, as compared to the braking force. For this reason, in the low state-of-charge state, a discharge amount of the battery 56 is suppressed by reducing the assist force. This makes it possible to extend a usable period of the hand cart 1 (period during which the hand cart 1 can be driven by the battery 56).

Further, the control section 50 operates to determine whether or not the state-of-charge is equal to or less than second state-of-charge threshold $C_{th1}$. When the state-of-charge becomes equal to or less than second state-of-charge threshold $C_{th2}$, the control section 50 operates to execute the aforementioned zero-speed control to generate a braking torque to hold the rotational speed of the wheel section 30 at zero. Thus, in this embodiment, it becomes possible to prevent the occurrence of a situation where the state-of-charge of the battery 56 is lowered close to 0(%), and thereby the hand cart 1 becomes out of control. Particularly, if the hand cart 1 becomes out of control or is automatically shut down, during walking on a sloped road, a user is likely to fall over. Thus, the hand cart 1 according to this embodiment is configured to be forcibly brought into a stopped state before the hand cart 1 cannot be normally operated. In this case, the hand cart 1 according to this embodiment may be configured such that, after an elapse of a given time from the time when the rotational speed of the wheel section becomes zero, an electric system thereof is automatically shut down, or the wheel section 30 is locked by the braking system 14.

Next, the parameter setting in the hand cart 1 according to this embodiment will be described.

In this embodiment, a used can set various parameters using the operation panel 40 and the external device 60. Examples of the settable parameter include: selection between the assist mode and the braking mode; the assist rate in the assist mode (the slope of the characteristic line in FIG. 4, i.e., the adjustment coefficient $k_P$); the braking force in the braking mode (flat-road set braking force $F_{D1}$); the braking force on a sloped road (downward-slope set braking force $F_{D2}$); the braking force during backward movement on a downward slope (downward-slope braking coefficient $k_D$); the upper limit speed vmax and the acceleration limit a of the hand cart 1; and selection between the zero-speed control mode and the virtual mass adjustment disabling mode in the case where a contact is detected by only one of the right and left grip sensors.

When the user manually operates the operation panel 40 to perform the parameter setting, the setting-change request signal is output from the operation panel 40 to the control section 50. Then, based on the setting-change request signal, the control section 50 operates to update the parameter setting data stored in the memory 57.

On the other hand, when the user performs the parameter setting using the external device 60, the setting-change request signal is transmitted from the external device 60 via a wireless network. Then, the control section 50 operates to receive the setting-change request signal through the communication section 57, and, in response to receiving the setting-change request signal, to determine whether or not the hand cart 1 is used for walking assist. Then, the control section 50 operates, when it determines that the hand cart 1 is not used for walking assist, to update the parameter setting data based on the received setting-change request signal. Thus, in this embodiment having the above feature, it becomes possible to prevent the occurrence of a situation where a user falls over due to a change in behavior of the hand cart 1 caused by a parameter changed by a third person during use of the hand cart 1.

For example, as determination as to whether or not the hand cart 1 is in use, the control section 50 operates to, based on the contact detection signal, determine whether or not a contact is detected, and/or, based on the rotational angle detection signal, detect whether or not the rotation of the wheel section 30 is stopped. Then, when no contact is detected, or when the rotation of the wheel section 30 is stopped, or when no contact is detected and the rotation of the wheel section 30 is stopped, the control section 50 operates to determine that the hand cart 1 is not used for walking assist.

Next, with reference to FIG. 12, an automatic parameter setting mode in the hand cart 1 according to this embodiment will be described.

The hand cart 1 according to this embodiment incorporates an automatic parameter setting mode for automatically setting given parameters. A user can manually operate the operation panel 40 to execute the automatic parameter setting mode. In the automatic parameter setting mode, when the user walks over a given distance (e.g., 10 m) while pushing the hand cart 1 on a trial basis, given parameters are automatically set, based on the cart speed detected during the walking and a fluctuation in the cart speed.

When the automatic parameter setting mode is started at time t0, the control section 50 operates, based on the rotational angle detection signal, to record a transit time at intervals of a given movement distance L (e.g., L=50 cm). In the example depicted in FIG. 12, during movement over 10 m, transit times t1 to t20 for 20 zones are recorded. Then, based on the transit times t1 to t20, the control section 50 operates to calculate: an average speed v1, ..., v20 in each zone ($L/(t_n-t_{n-1})$, n=1 to 20); a time p1, ..., p20 required for passing through each zone ($t_n-t_{n-1}$, n=1 to 20); a difference (absolute value) d3, ..., d20 between a required time of one zone and a required time of a previous zone ($|p_n - p_{n-1}|$, n=3 to 20); and a total $d_{total}$ of the time differences in the respective zones (total of d3 to d20). In some zones (zones 0 to 2) in a startup stage where walking is unstable, the time difference is not calculated.

As the fluctuation in cart speed becomes smaller, the total $d_{total}$ becomes smaller, which is deemed that the user walks with steady steps. Thus, the control section 50 operates to set the assist rate in the assist mode according to a level of the total $d_{total}$, in conformity to a parameter setting table (a table in which a recommended assist rate is associated with the total $d_{total}$) stored in the memory 57. Specifically, as the total $d_{total}$ becomes smaller (walking is more stable), the assist rate is set to a larger value, i.e., as the total $d_{total}$ becomes larger (walking is more unstable), the assist rate is set to a smaller value.

Further, the control section 50 operates to select a fourth-largest one of the zone average speeds v1 to v20, and set, as the upper limit speed vmax, a value obtained by adding a given additional value (e.g., 0.5 km/h) to the selected average speed. Further, the control section 50 operates to set the acceleration limit a corresponding to the set upper limit speed vmax, in conformity to a parameter setting table (a table in which a recommended acceleration limit is associated with the upper limit speed).

Further, the control section 50 operates to set the flat-road set braking force $F_{D1}$ and the downward-slope set braking force $F_{D2}$ corresponding to the set upper limit speed vmax, in conformity to a parameter setting table (a table in which a recommended flat-road set braking force and a recommended downward-slope set braking force are associated with the upper limit speed).

As above, in this embodiment, it becomes possible to automatically set various parameters while reflecting a user's actual usage state, based on the cart speed during test walking and the fluctuation in the cart speed.

In the above embodiment, a specific type of hand cart is described as one embodiment of the present invention. However, the present invention is not limited thereto, but may be applied to any other type of hand cart, such as a walking frame for assisting self-sustained walking, a cart capable of supporting walking of an elderly person and carrying articles, and a baby buggy or carriage.

REFERENCE NUMERALS

1: hand cart
10: cart body
20: handle bar (grip member)
30: wheel section
33: drive wheel
33a: right drive wheel
33b: left drive wheel
35: wheel driving section
35a, 35b: driving unit
40: operation panel
50: control section
$F_A$: assist force
$F_B$: braking force
$F_C$: gravitational compensation force
$F_{D1}$: flat-road set braking force
$F_{D2}$: downward-slope set braking force
$F_G$: gravitational force-component
$F_H$: hand manipulation force
$F_P$: virtual mass adjusting force

The invention claimed is:

1. A hand cart comprising:
 a cart body;
 a grip member coupled to the cart body and constructed to be gripped by a user during walking;
 a wheel section for moving the cart body in conformity with walking of the user;
 a battery for supplying electric power;
 a wheel driving section for driving the wheel section by electric power from the battery;
 a grip sensor for detecting a contact of the user with the grip member,
 a rotational angle sensor for detecting a rotational angle of the wheel section;
 an inclination angle sensor for detecting an inclination angle of the cart body;
 a torque sensor for detecting a torque acting on the wheel driving section; and
 a control section for controlling the wheel driving section,
 wherein the control section is operable, based on the rotational angle of the wheel section detected by the rotational angle sensor, to calculate a movement distance and a traveling direction of the cart body, and, according to the traveling direction and the inclination angle of the cart body, to execute an assist control of causing the wheel driving section to generate a driving torque for producing an assist force in the traveling direction or a braking torque for producing a braking force in a direction opposite to the traveling direction, and
 wherein the control section is operable, based on the movement distance and the inclination angle of the cart body, to calculate an angular change rate of the inclination angle per unit movement distance of the cart body, and, when the grip sensor detects the contact with the grip member, and the angular change rate is equal to or less than a given threshold, to execute the assist control.

2. The hand cart as recited in claim 1, wherein the control section is operable, based on the calculated traveling direction and the inclination angle of the cart body, to determine whether the cart body is moving on a sloped road forwardly and upwardly, or forwardly and downwardly, or backwardly and downwardly, or backwardly and upwardly, and, based on the inclination angle of the cart body, to calculate a component of gravitational force to be applied to the hand cart in a direction parallel to a surface of the sloped road, and wherein, the control section is operable, during the assist control, (i) when the cart body is moving on the sloped road forwardly and upwardly, to generate the driving torque to produce a gravitational compensation force capable of counterbalancing the gravitational force component parallel to the surface of the sloped road;

(ii) when the cart body is moving on the sloped road forwardly and downwardly, to generate the braking torque to produce a braking force greater than the gravitational force component parallel to the surface of the sloped road;

(iii) when the cart body is moving on the sloped road backwardly and downwardly, to generate the braking torque to produce a braking force less than the gravitational force component parallel to the surface of the sloped road; and (iv) when the cart body is moving on the sloped road backwardly and upwardly, to generate the driving torque to produce a gravitational compensation force capable of counterbalancing the gravitational force component parallel to the surface of the sloped road.

3. The hand cart as recited in claim 1, wherein, during the assist control, the control section is operable to correct the gravitational compensation force in such a manner as to increase or reduce the gravitational compensation force.

4. The hand cart as recited in claim 1, wherein the control section is operable, when the grip sensor does not detect any contact with the grip member, to cause the wheel driving section to generate the braking torque in such a manner as to allow a rotational speed of the wheel section calculated based on the rotational angle of the wheel section to become zero.

5. The hand cart as recited in claim 1, wherein the control section is operable to compare a cart speed of the hand cart calculated based on the rotational angle of the wheel section with a given upper limit speed, and, when the cart speed becomes greater than the upper limit speed, to cause the wheel driving section to generate the braking torque in such a manner as to allow the cart speed to become equal to the upper limit speed.

6. The hand cart as recited in claim 1, wherein the control section is operable to compare a cart speed of the hand cart calculated based on the rotational angle of the wheel section with a target speed which increases with a given acceleration limit, and, when the cart speed becomes greater than the target speed, to cause the wheel driving section to generate the braking torque.

7. The hand cart as recited in claim 1, wherein the inclination sensor is operable to detect inclination angles of the cart body at least in a front-rear direction and in a lateral direction thereof, and
the wheel section comprises a right wheel and a left wheel which are capable of being independently driven by the wheel driving section, and
wherein the control section is operable, when the cart body is determined to be in a laterally inclined posture based on the inclination angle of the cart body, to control the wheel driving section to drive the right wheel and the left wheel independently in such a manner as to inhibit the cart body from deviating laterally from the traveling direction.

8. The hand cart as recited in claim 4, further comprising an electronically-controlled braking system capable of mechanically locking the wheel section, the braking system being configured to maintain a state in which the wheel section is mechanically locked, without receiving any supply of electric power from the battery, after mechanically locking the wheel section,
wherein the control section is operable, when the grip sensor does not detect the contact with the grip member continuously for a given period of time, to cause the braking system to lock the wheel section, and stop the torque generation based on the assist control.

9. The hand cart as recited in claim 1, wherein the control section is operable to determine that the cart body overturns when the inclination angle of the cart body is greater than a given angle, and then cause the wheel driving section to generate the braking torque in such a manner as to allow a rotational speed of the wheel section calculated based on the rotational angle of the wheel section to become zero.

10. The hand cart as recited in claim 1, wherein the control section is operable to detect a state-of-charge of the battery, and, when the state-of-charge of the battery becomes equal to or less than a first state-of-charge threshold, to execute the assist control in such a manner as to reduce the driving torque, but not to reduce the braking torque, as compared to when the state-of-charge of the battery is greater than the first state-of-charge threshold.

11. The hand cart as recited in claim 1, wherein the control section is operable to detect a state-of-charge of the battery, and, when the state-of-charge of the battery becomes equal to or less than a second state-of-charge threshold, to cause the wheel driving section to generate the braking torque in such a manner as to allow a rotational speed of the wheel section calculated based on the rotational angle of the wheel section to become zero.

12. The hand cart as recited in claim 1, wherein the inclination sensor comprises an angular speed sensor and an acceleration sensor, and
wherein the inclination angle of the cart body is calculated based on an angle obtained by integrating output values of the angular speed sensor and an inclination angle obtained from the acceleration sensor.

13. The hand cart as recited in claim 12, wherein the control section is operable, when it determines that there is no fluctuation in output value of the acceleration sensor, to perform a zero point correction for the angular speed sensor.

14. The hand cart as recited in claim 2, further comprising a force sensor for detecting a pressure applied from the user to the grip member,
wherein the control section is operable, when it determines that the cart body is in a posture where a front portion thereof is located above a rear portion thereof based on the inclination angle of the can body, and determines that a pressure is applied to the grip member in a direction backward of the cart body based on a detection of the pressure by the force sensor, to execute the assist control for the situation where the cart body is moving on the sloped road backwardly and downwardly.

15. The hand cart as recited in claim 2, further comprising a force sensor for detecting a pressure applied from the user to the grip member,
wherein the control section is operable to execute the assist control in such a manner as to add, to the assist force, an additional assist force derived from multiplying, by a constant scale factor, the pressure detected by the force sensor.

16. The hand cart as recited in claim 15, wherein the control section is operable, when the cart body is moving on the sloped road forwardly and downwardly, not to add the additional assist force.

17. The hand cart as recited in claim 16, wherein the grip sensor comprises a right detection section and a left detection section provided, respectively, in a right region and a left region of the grip member, and each operable to detect a contact of the user with the grip member, and
wherein the control section is operable, when the grip sensor detects the contact of the user by only one of the right detection section and the left detection section, to cause the wheel driving section to generate the braking torque in such a manner as to allow a rotational speed of the wheel section calculated based on the rotational angle of the wheel section to become zero.

18. The hand cart as recited in claim 16, wherein the grip sensor comprises a right detection section and a left detection section provided, respectively, in a right region and a left region of the grip member, and each operable to detect a contact of the user with the grip member, and
wherein the control section is operable, when the grip sensor detects the contact of the user by only one of the right detection section and the left detection section, not to add the additional assist force.

19. The hand cart as recited in claim 16, wherein the control section is capable of changing at least one of a plurality of parameters consisting of: the constant scale factor for use in deriving the additional assist force from the pressure detected by the force sensor, the upper limit speed and the acceleration limit; a magnitude of the braking force to be generated when the cart body is moving on the sloped road forwardly and downwardly; selection as to whether, when the grip sensor detects the contact of the user by only one of the right detection section and the left detection section thereof, the control section operates to cause the wheel driving section to generate the braking torque in such a manner as to allow the rotational speed of the wheel section to become zero, or not to add the additional assist force; and a magnitude of a braking force to be added during movement on a flat road.

20. The hand cart as recited in claim 19, wherein the control section has an automatic parameter setting mode, and wherein the control section is operable, in the automatic parameter setting mode, to set at least one of the parameters, based on the cart speed of the hand cart and a fluctuation in the cart speed calculated using the rotational angle of the wheel section obtained as a result of movement of the hand cart over a given distance.

21. The hand cart as recited in claim 19, further comprising an external device operable to transmit a setting-change request signal for changing the setting of the at least one parameter, via a wireless line,
    wherein the control section is operable, at least when the grip sensor does not detect the contact with the grip member, or the control section detects a stopped state of the hand cart based on the rotational angle of the cart body, at a time when the control section receives the setting-change request signal from the external device, to change the setting of the at least one parameter based on the setting-change request signal.

* * * * *